United States Patent

[11] 3,610,302

[72] Inventor Bruce John McColl
Whitby, Ontario, Canada
[21] Appl. No. 61,241
[22] Filed Aug. 5, 1970
[23] Division of Ser. No. 572,530, Aug. 15, 1966, Pat. No. 3,533,458.
[45] Patented Oct. 5, 1971
[73] Assignee Owens-Illinois, Inc.

[54] IMPACT SHEAR DEVICE
4 Claims, 26 Drawing Figs.
[52] U.S. Cl. .................................................... 144/34 E
[51] Int. Cl. .................................................... A01g 23/02
[50] Field of Search .......................................... 144/34 R,
34 E, 3 D, 309 AC, 2 Z

[56] References Cited
UNITED STATES PATENTS
1,509,994 9/1924 Carroll .................... 144/34 R
3,461,929 8/1969 Hunger et al. ............ 144/34 E
3,540,501 11/1970 Jonsson .................... 144/34 E Primary Examiner—Gerald A. Dost
Attorney—Beveridge & De Grandi ABSTRACT: A shearing mechanism for a tree harvester having a pair of arms each carrying a weighted shear blade at one end and affixed at the other end to each of a pair of parallel shafts supported by the harvester with the shafts being rotated in opposite directions to move the arms between a first position in which the shear blades face outwardly in opposite directions from upwardly extending arms and a second position in which the shear blades face inwardly adjacent each other in opposite directions from downwardly extending arms.

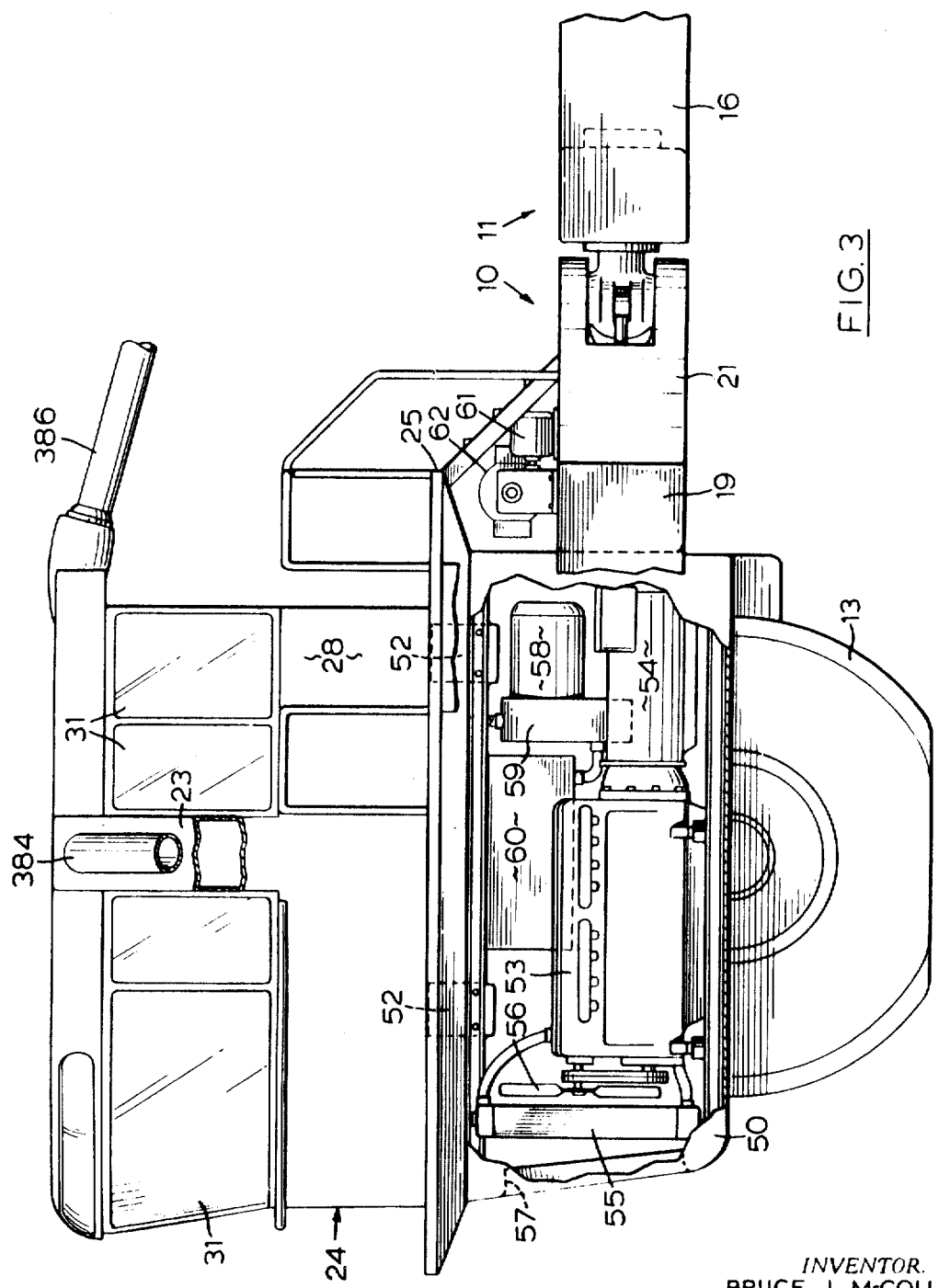

INVENTOR.
BRUCE J. McCOLL

ATTORNEYS

INVENTOR.
BRUCE J. McCOLL

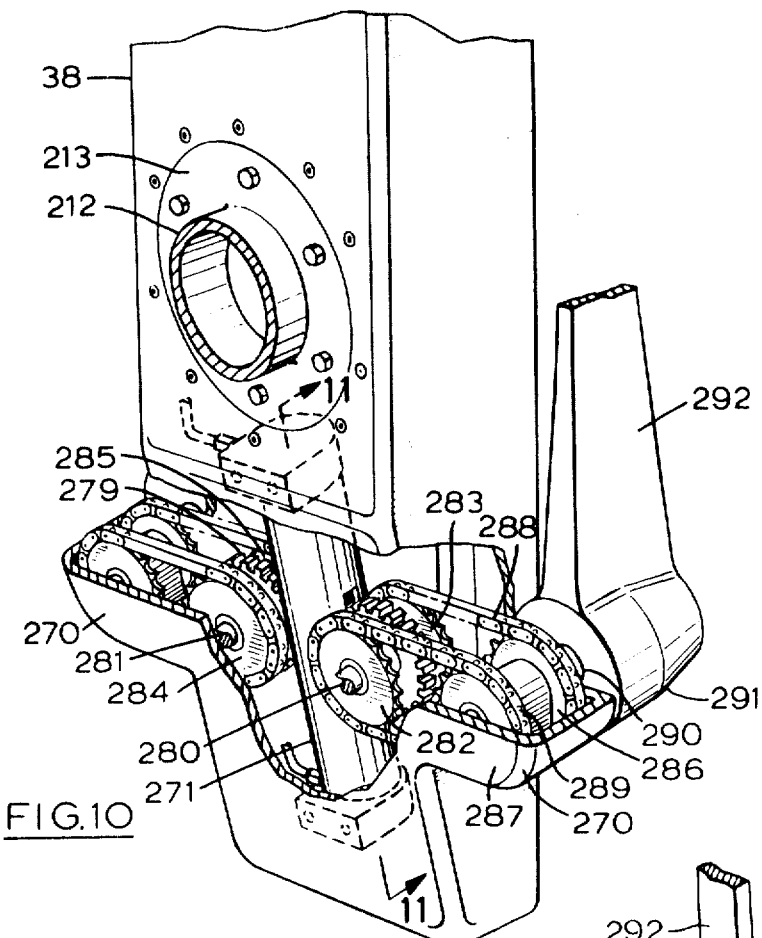
FIG. 10
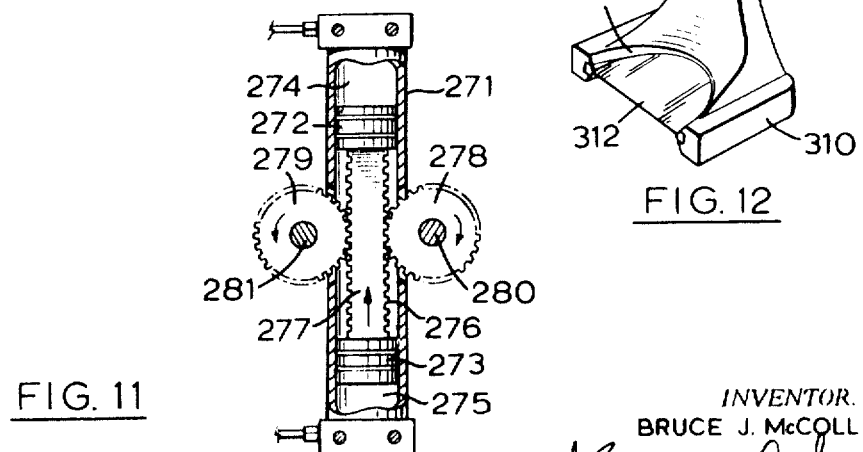
FIG. 11
FIG. 12
INVENTOR.
BRUCE J. McCOLL
BY Beveridge & DeBrandi
ATTORNEYS

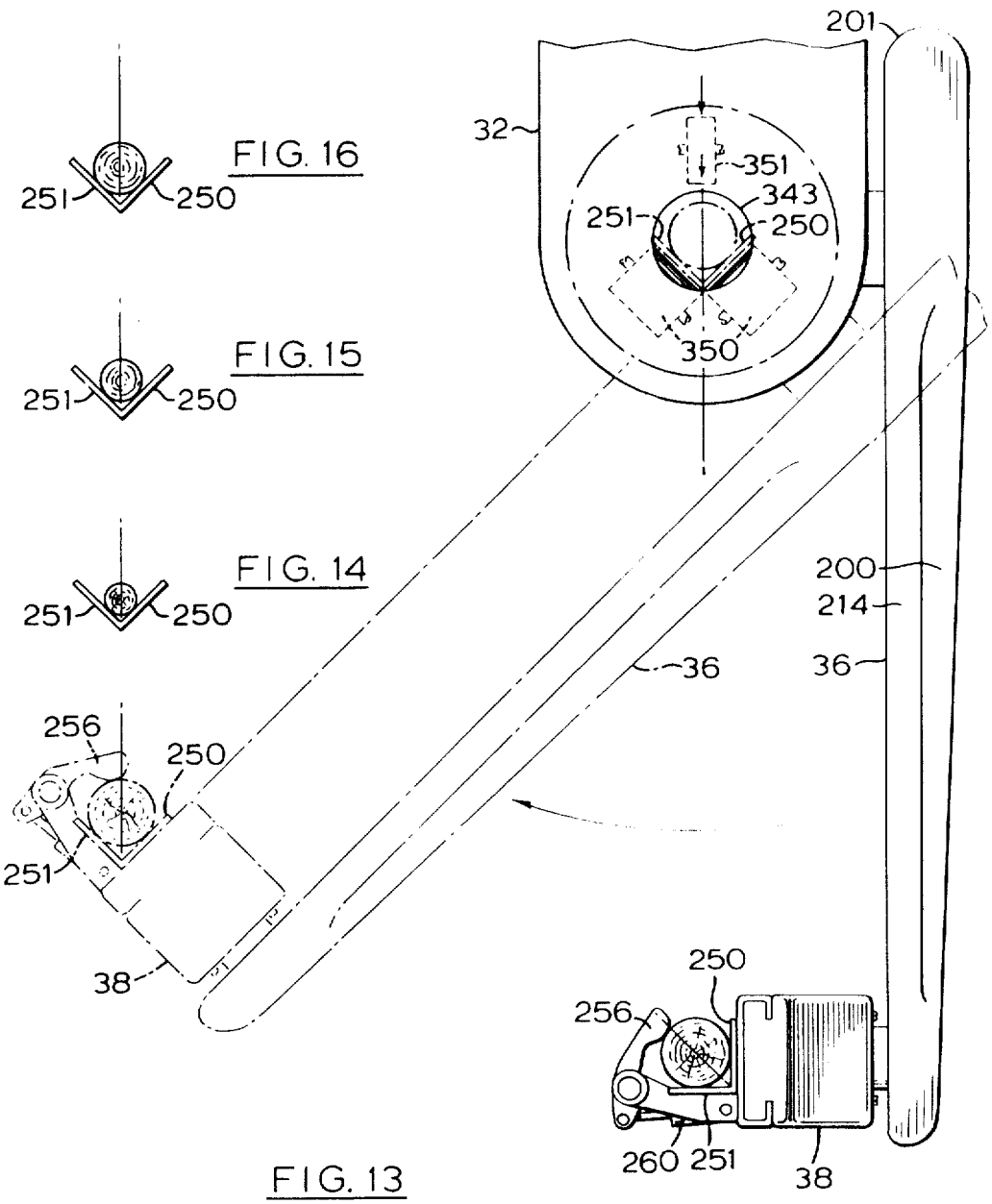

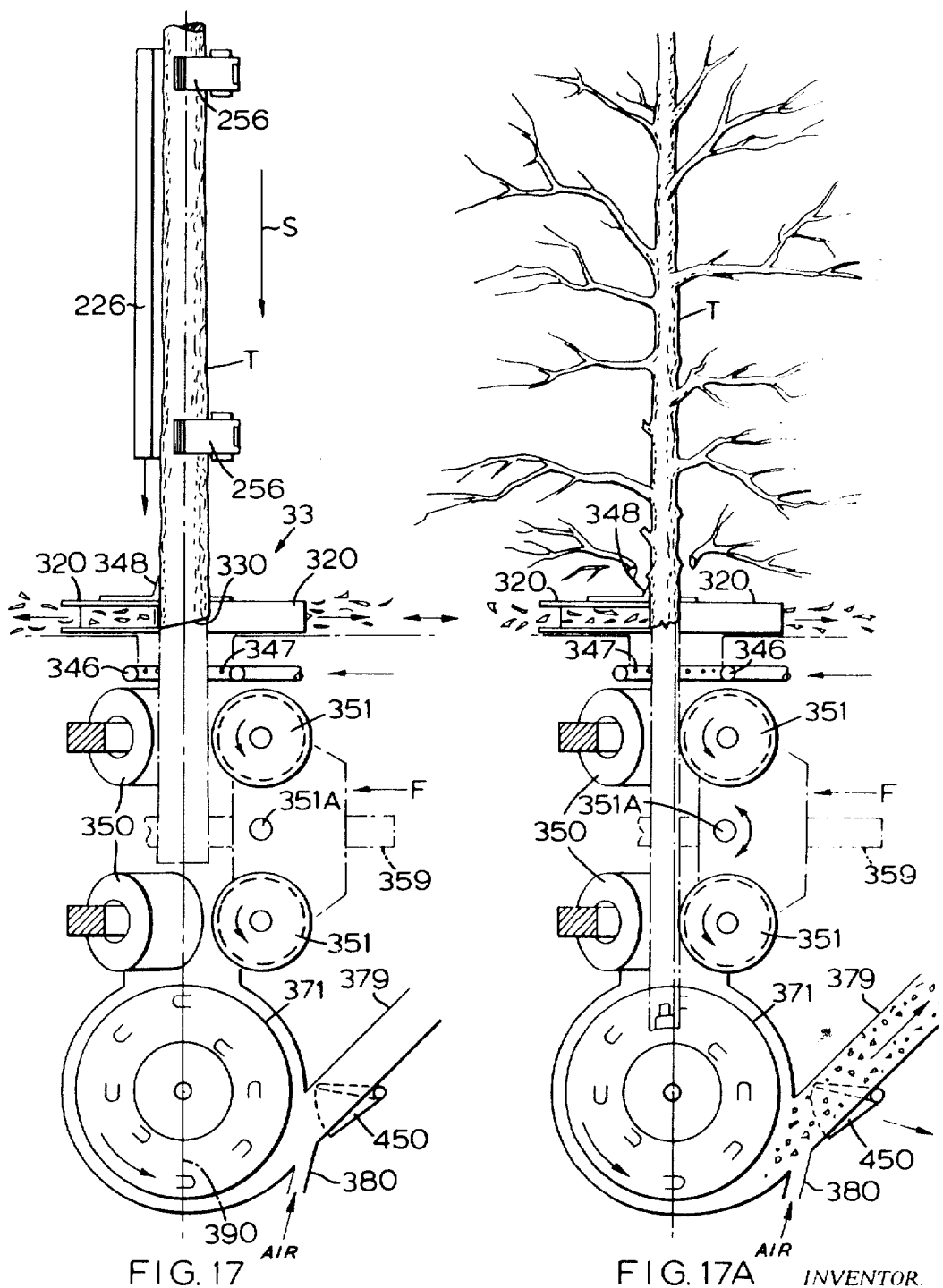

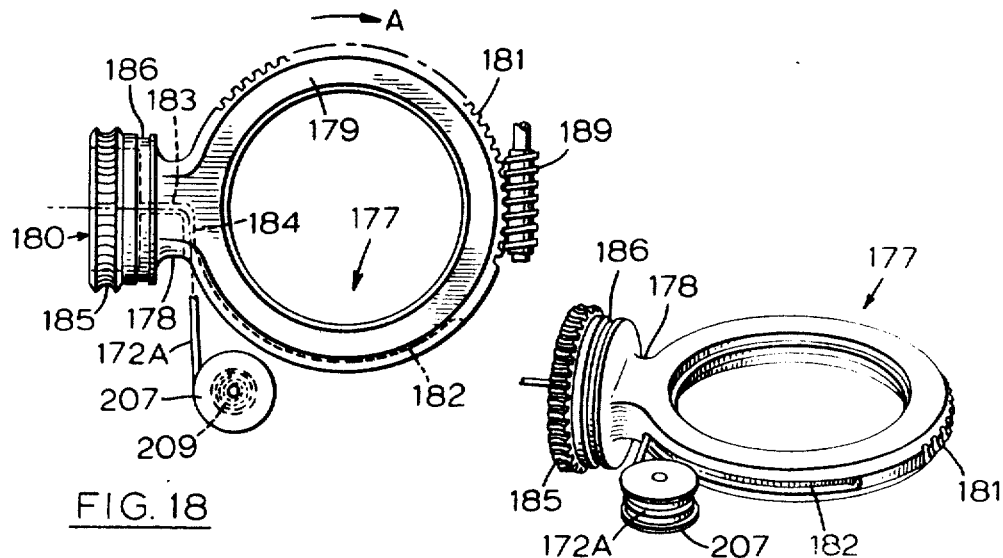
FIG. 18
FIG. 19
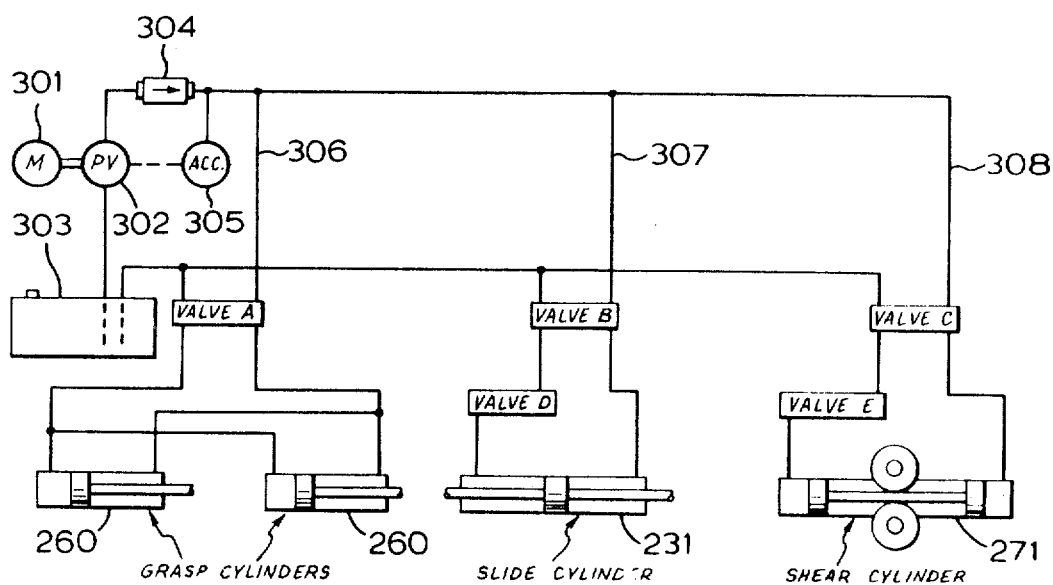
FIG. 23
INVENTOR.
BRUCE J. McCOLL
ATTORNEYS INVENTOR.
BRUCE J. McCOLL
BY Beveridge & De Grandi
ATTORNEYS

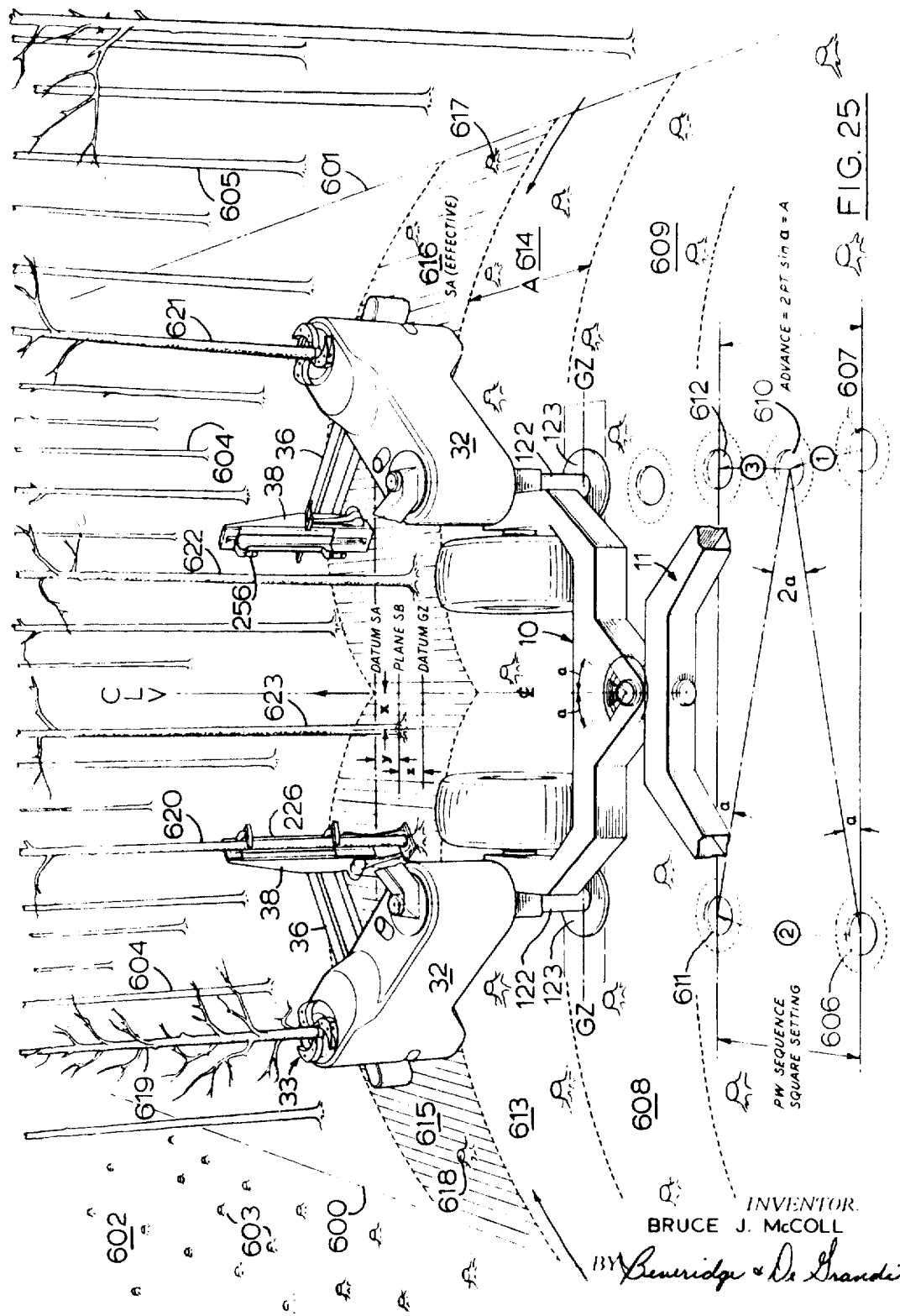

3,610,302

1

IMPACT SHEAR DEVICE

This application is a division of U.S. application Ser. No. 572,530 filed Aug. 15, 1966. and now U.S. Pat. No. 3,533,458.

The present invention is concerned with the production of wood chips suitable for use as a raw material by pulp and paper mills. In particular, the invention concerns itself with a machine by means of which the operations involved in converting a living, growing tree into such chips can be completely mechanized and, in large part, automated.

The pulp and paper industry has come to recognize in recent years that its current methods of conducting its forest operations introduce such high and increasing costs that some way to achieve either economy or increased efficiency in productivity must be found. To this end, a number of attempts at mechanization have been made, mostly in the direction of providing mechanical devices to perform one or more of the operations which have traditionally been carried out by manual labor. These attempts cannot, it is believed, solve or in some cases, even alleviate the problems which have heretofore been inherent in forest operations and which remain inherent therein as long as any portion of the operation remains dependent upon manual labor.

A chain may be considered to extend between a forest stand and a pulpmill. The last link in this chain is the final transport by road, rail or water from the forest to the pulpmill. This link is already reasonably efficient.

The operations in the logging area which precede this final transport, however, such as felling, debranching, debarking, cutting to length and gathering for final transport have not been subject to any overall examination with the view to achieving an efficient, integrated and mechanized operation which becomes independent of such interfering parameters as weather, seasons, darkness and the limited productivity of human labor.

The present invention seeks to provide a machine and a system of operation by which, in the end result, raw material for pulp and paper manufacture can be produced by a highly efficient, completely mechanized and largely automated operation. Stated in its simplest terms, the present invention contemplates a mobile factory constituted by a large, special purpose vehicle which provides a stabilized platform for at least one wood chip producing machine and which may move through a forest area to remove trees from their stumps, process the trees to eliminate bark and branches and to convert the tree trunk to chips. The chips are stored in a container carried by the vehicle, the container being detachable from the vehicle so that when it is full it may be deposited for further transport by conventional means and replaced by a fresh empty container for the continuation of the machine function.

The many advantageous features of the invention and the ways in which its efficient operation are ensured will become apparent from the following detailed description of one embodiment which is illustrated by way of example in the accompanying drawings in which like reference numerals denote like parts in the various views and in which:

FIG. 3 is a side elevation, partly cutaway, of the forward portion of the machine showing the location of the source of electric, hydraulic and pneumatic power for the various machine functions;

2

Figure 1:
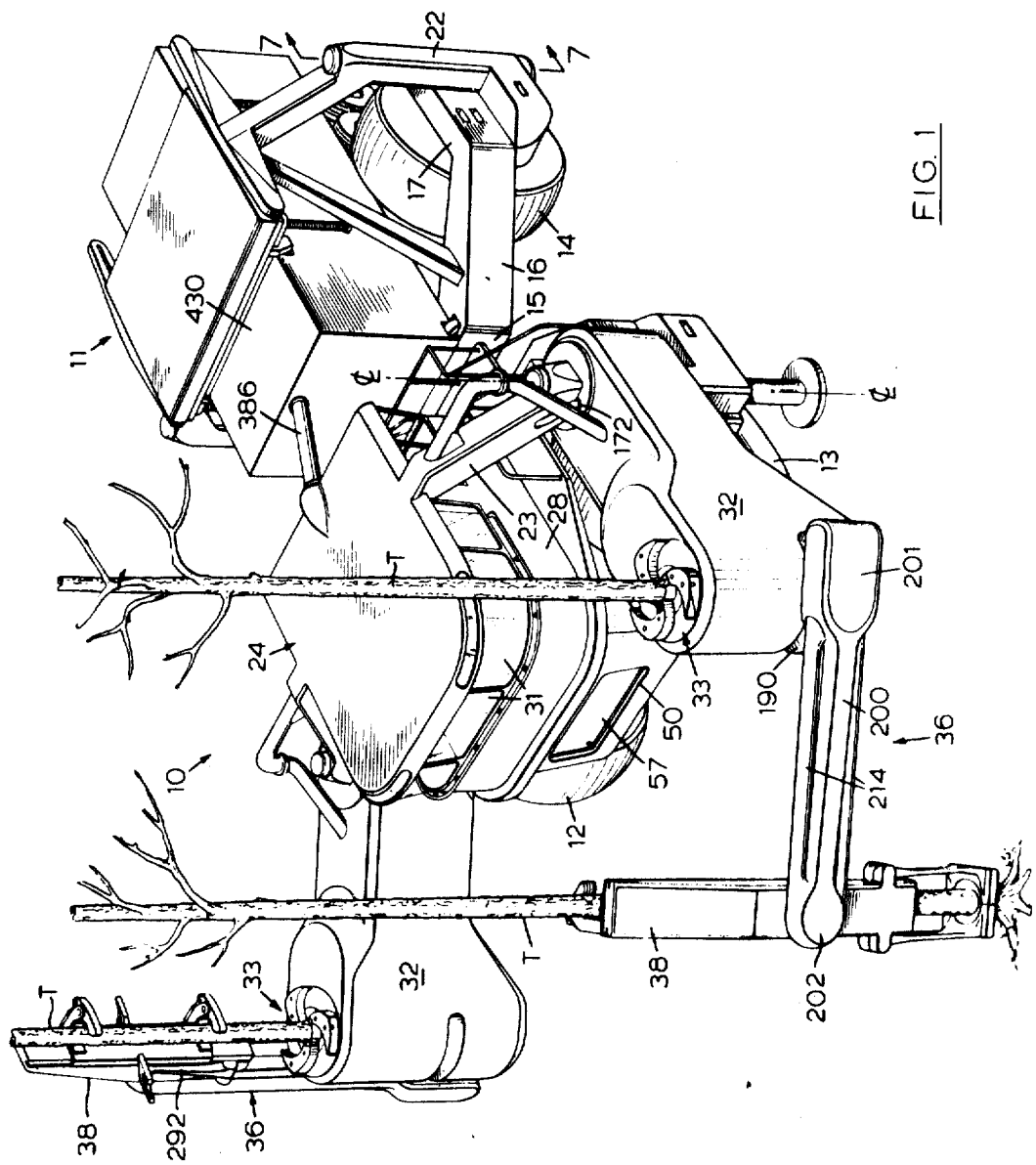
FIG. 1 is an overall perspective view, taken from the forward end of a machine embodying the present invention.
Figure 2:
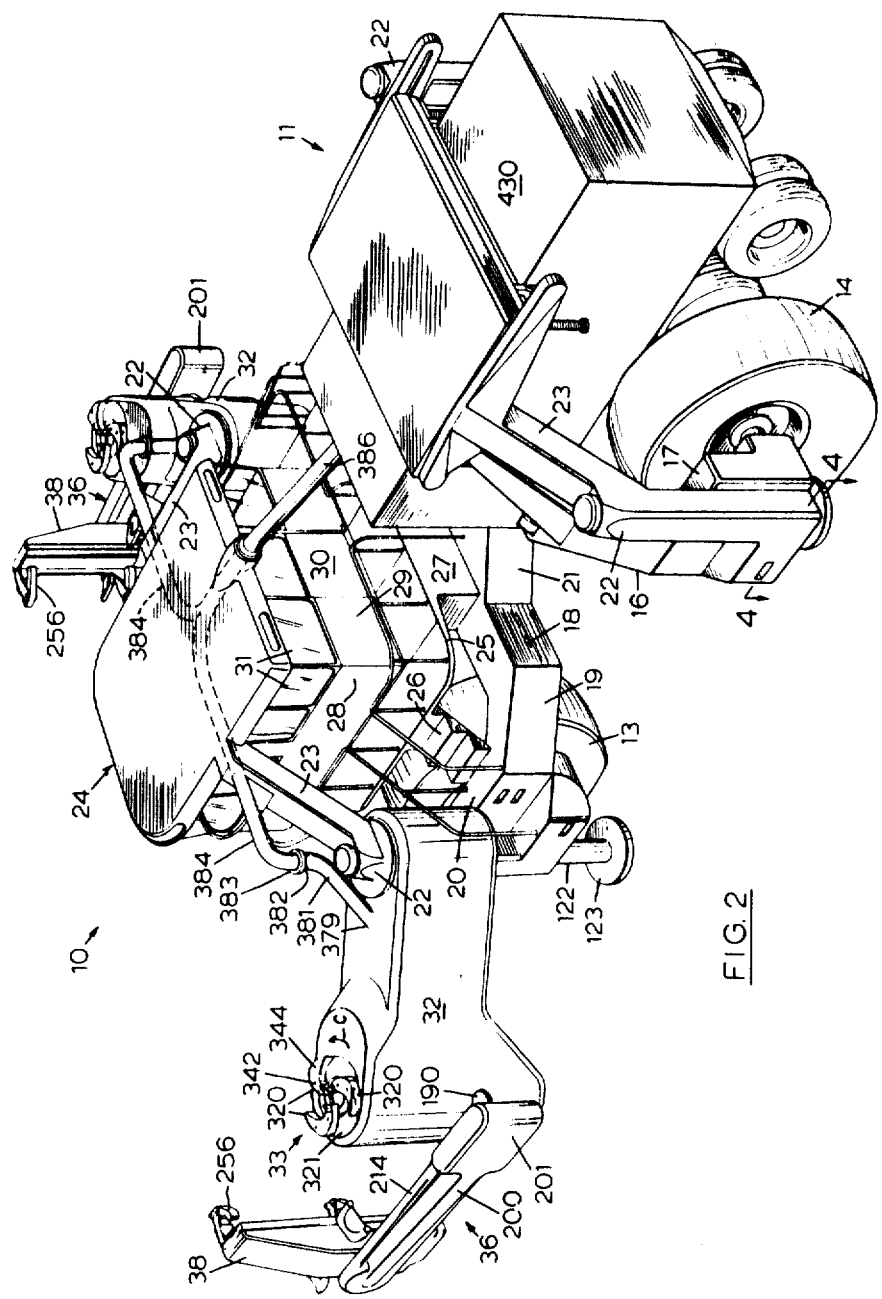
FIG. 2 is a perspective view similar to FIG. 1 taken from the rear quarter of the machine.
Figure 8:
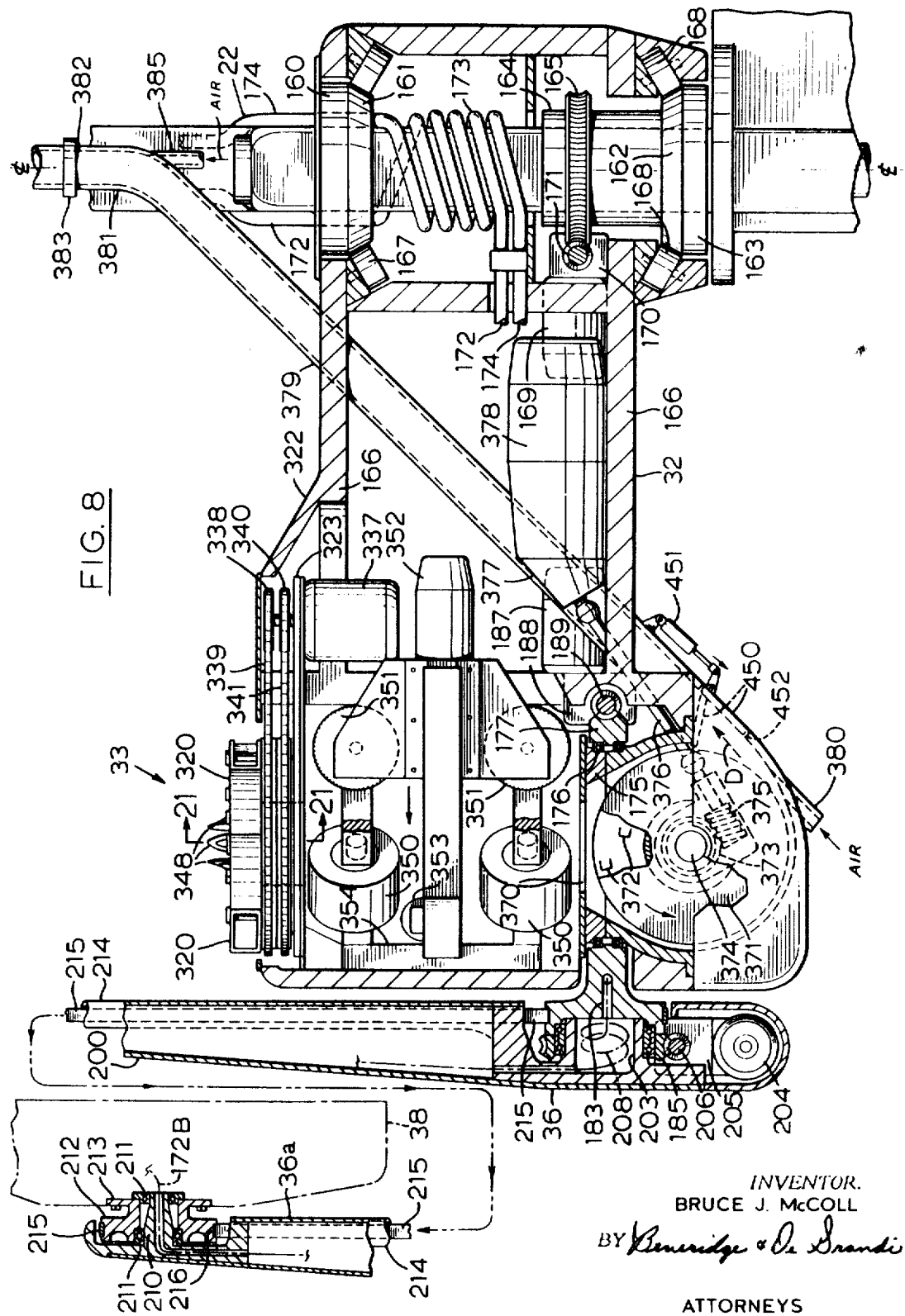
Figure 9:
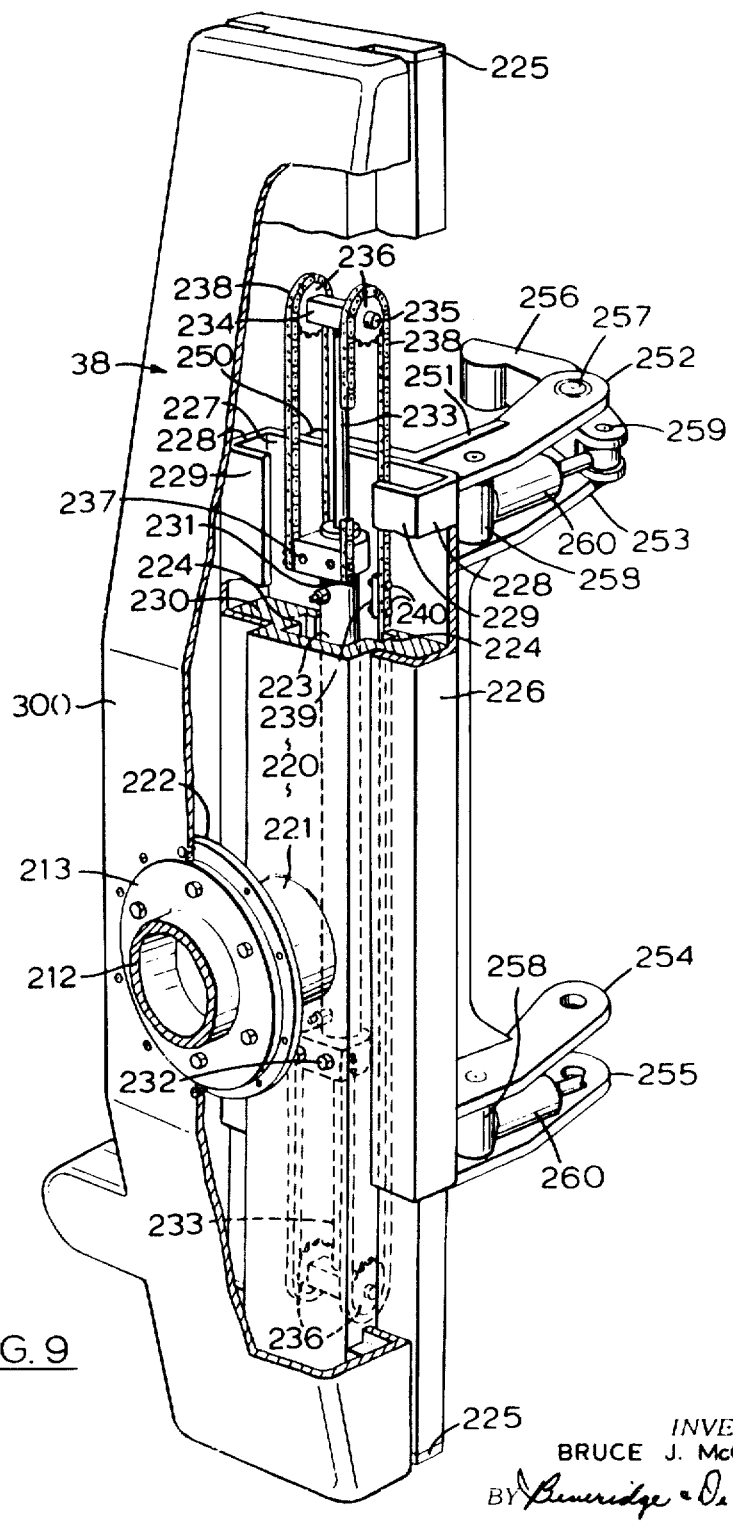
Figure 21:
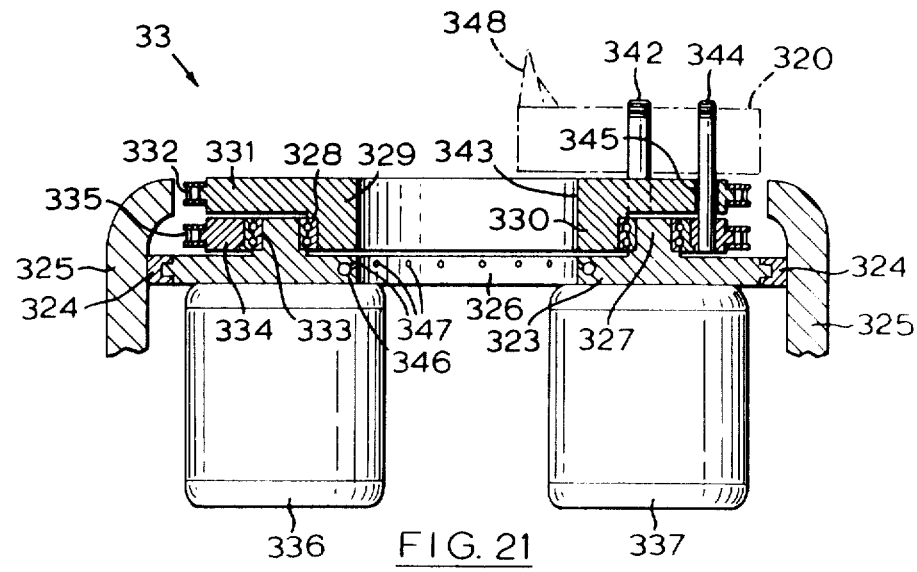
Figure 20:
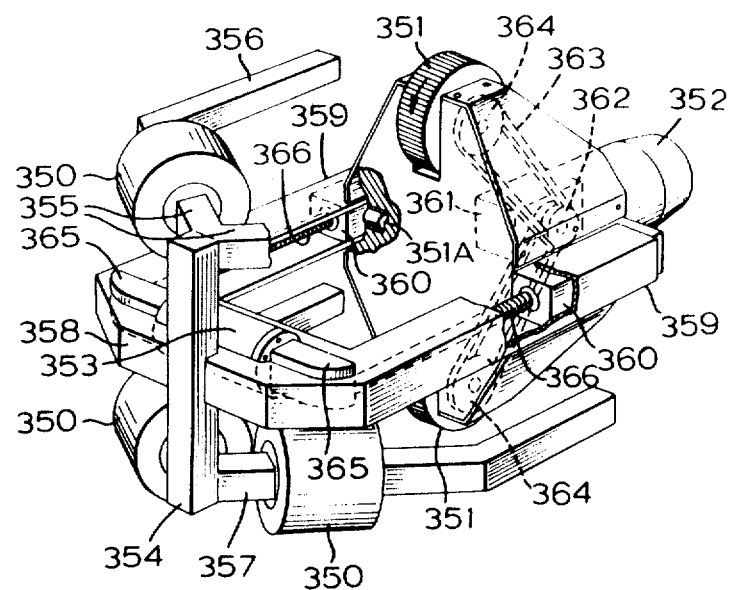
Figure 22:
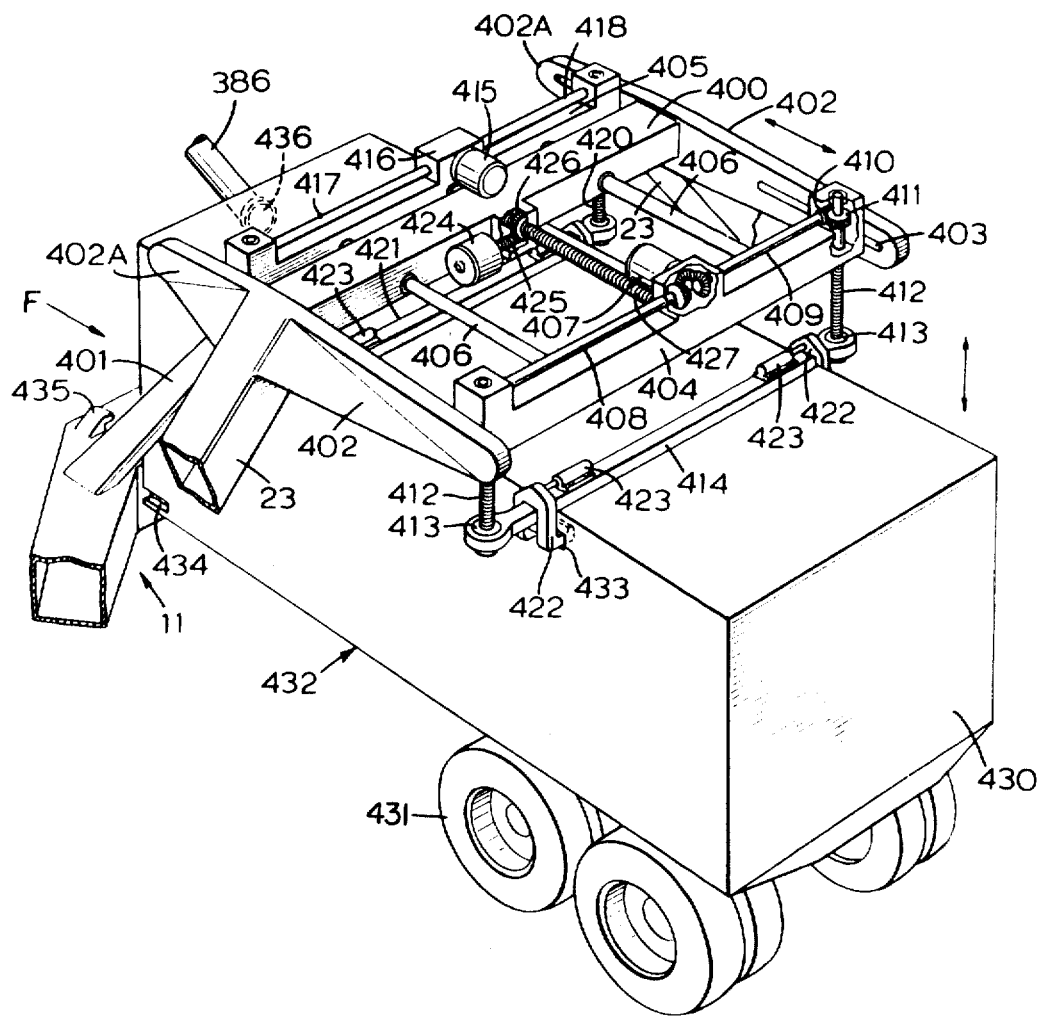
Figure 24:
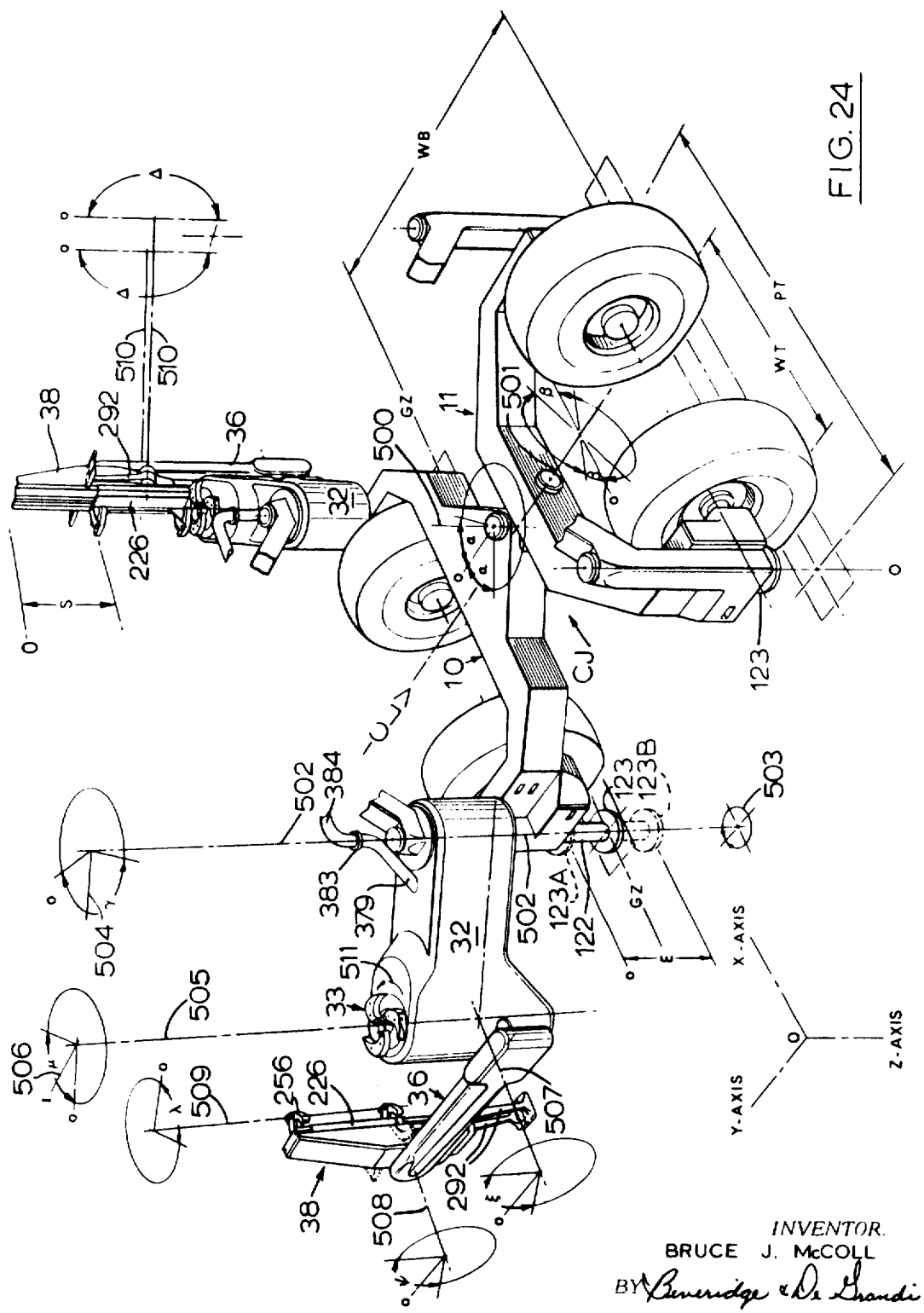

FIG. 8 is a section view taken through one "primary arm" showing its mounting arrangement and the mounting of the secondary arm;

FIG. 9 is a perspective view, partly broken away, of the tree grasping and shearing head carried by the free end of the secondary arm;

FIG. 10 is a perspective view, partly broken away, of the tree shearing mechanism carried by the lower end of the head illustrated in FIG. 9;

FIG. 11 is a fragmentary view in section, along line 11—11 of FIG. 10, of a portion of the apparatus for actuating the tree shearing mechanism;

FIG. 12 (sheet 10) is a perspective view showing the lower end of one of the tree shears, the upper end of which is shown in FIG. 10;

FIG. 13 is a schematic or diagrammatic view, in plan, showing the free end of the primary arm and showing the relationship between the geometry of the secondary arm and the head relative to the tree receiving portion of the primary arm;

FIGS. 14, 15 and 16 are diagrammatic views showing the relationship between the tree grasping mechanism and trees of different diameters;

FIG. 17 is a diagrammatic view of the tree-processing mechanism showing the relationship of the various tree-processing mechanisms as the lower end of a tree trunk is being introduced therein;

FIG. 17A is a view similar to FIG. 17 showing the relationship of the same mechanism to the same tree towards the end of the processing operation upon that tree;

FIG. 18 is a fragmentary plan view of a portion of the mechanism by means of which the secondary arm is mounted upon the primary arm;

FIG. 19 is a perspective view of the device of FIG. 18;

FIG. 20 is a fragmentary perspective view of the tree-feeding mechanism removed from the environment in which it is shown in FIG. 8;

FIG. 21 is a section view taken along line 21—21 of FIG. 8;

FIG. 22 is a perspective view, partly cutaway, of a portion of the rear section of the machine shown in FIGS. 1 and 2 and illustrating the manner in which the chip-receiving container may be mounted upon and removed from the vehicle;

FIG. 23 (sheet 8) is a simplified schematic of a suitable hydraulic power pack which may be carried within the head shown in FIG. 9;

FIG. 24 is a diagrammatic view, partly cutaway, showing the device of FIGS. 1 and 2 and showing the axes, planes, directions and extent of vehicle and machine component movements and their relationships; and FIG. 25 is a diagrammatic perspective view, partly cutaway, showing the device of FIGS. 1 and 2 in operation in a typical forest area.

As will become apparent as the description proceeds, the machine of the present invention is symmetrical about a longitudinal center line. Accordingly, it has a right-hand side and a left-hand side and, whenever the terms "right-hand" or "left-hand" are used in the following description they should be taken to mean "right-hand" or "left-hand" with respect to the portion of the machine when seen as in FIG. 2. Similarly terms such as "up," "down," "front" and "rear" all have reference to directions superimposed on FIG. 2.

OVERALL MACHINE CONFIGURATION

The entire machine which is shown in FIGS. 1 and 2 is constituted by, as was discussed in the introduction, a large, mobile vehicle supporting a wood chip producing machine which may move through a forest region and remove trees from their stumps, process the tree to remove unwanted bark and branches and to reduce the tree trunk to chips which are then stored in a container carried by the vehicle.

The various components of the machine, both functional and structural will be separately described in greater detail with reference to the succeeding sheets and figures of drawings accompanying this application. To begin with, however, a general discussion of the overall machine will simplify the following description of the components and will enable the relationship between these components and the overall machine to be more readily understood and appreciated.

Referring, therefore, to FIGS. 1 and 2 the machine can be seen to generally comprise what may be termed a forward chassis section identified by reference character 10 and a rear chassis section identified by reference character 11. The front and rear chassis sections 10 and 11 are secured together at a center joint or trunnion about which the two chassis sections may be articulated about a vertical axis, the plane of articulation being horizontal. Limited freedom is provided for the front and rear chassis sections 10 and 11 to roll relative to one another about a horizontal axis aligned generally longitudinally of the vehicle but no freedom of movement is provided between chassis sections about the horizontal axis extending transversely of the vehicle. The details of the center joint construction and the manner in which the vehicle may be articulated at this point will be described in greater detail with reference to FIGS. 5 and 6. For the time being, however, it is sufficient to appreciate that the chassis sections 10 and 11 may be articulated with respect to one another to provide for vehicle steering and, as will be described in greater detail below, to provide for accurate vehicle advance during the tree-processing operation.

Each chassis section 10 and 11 is supported by a pair of ground-engaging wheels, wheels 12 and 13 being associated with the forward chassis section 10 and a pair of wheels, only one of which, 14, can be seen are associated with the rear chassis section 11. The application of motive power to the ground-engaging wheels in a manner which will be described in greater detail with reference to FIGS. 3 and 4 enables the vehicle to move forwardly or rearwardly and the articulation of chassis 10 and 11 with respect to one another provide for vehicle steering.

Each chassis section comprises a main chassis frame which, in general, is of roughly V-shape, the apex of the V being located adjacent the center joint axis of articulation and the two legs of the V terminating in parallel portions adjacent each wheel station. Referring to FIG. 1, the chassis frame for the rear chassis section 11 is truncated at its apex to provide for a central portion 15 which merges with a secondary portion 16 which, in turn, terminates in portion 17 which is parallel to a corresponding portion on the other side of the vehicle, the two portions 17 housing the wheel station and associated equipment which will be described in greater detail below. The forward chassis section is similar to the rear chassis section and comprises a truncated portion 18, an angled portion 19 and a portion 20 which is parallel to a corresponding portion on the other side of the vehicle and which houses the forward chassis wheel stations and equipment associated therewith. The forward chassis section carries, at the truncated portion 18, a rearwardly extending housing 21 which houses the center joint trunnion and the actuating mechanism by means of which vehicle articulation is achieved.

Extending upwardly and inwardly from each chassis frame portion 20 of front chassis 10 and from each rear chassis portion 17 is an upwardly extending frame member 22 from which there extends an inwardly sloping frame member 23 terminating in a central horizontal arch or bridging member joining corresponding structural members 23 and 22 on the other side of the chassis section.

In the case of the forward chassis section 10, structural members 22 and 23 and the horizontal bridging member (not shown) support a cab or operator control center 24. A deck 25 provides a floor for the control center 24 and this deck is supported, in part, by structural members constituting access stairs 26 and by a support pylon 27 carried by the forward chassis element 18. Suitable structural members depending from the frame members 22, 23 and their bridging member and incorporated in the structure of the control center 24 will serve to rigidly mount and carry this compartment in the position shown in FIGS. 1 and 2. As can be seen in the drawings, the control center is housed within walls 28 and 29 and access to the control center is provided by door 30. Windows 31 surrounding the control center enable the machine operators located therein to maintain visual supervision over all functions of the machine in all directions.

Also associated with the front chassis section 10 are the tree grasping, severing and processing elements and while these will be discussed in substantially greater detail below, it can now be seen that the vertical frame member 22 constitutes a column having a vertical axis about which is mounted a primary arm 32. The primary arm is movable in a horizontal plane about the vertical axis of structural member 22 and carries, as can be seen in FIG. 2, a debranching and debarking mechanism 33 which surrounds a central opening through which the butt end of a severed tree may be introduced into the processing apparatus carried within the housing of the primary arm 32. The function of this apparatus housed within arm 32 is to, initially, remove unwanted branches and bark, feed the tree downwardly and to reduce the tree to chips which will then be conveyed, as will be later described, into a container carried by the rear chassis section 11 of the machine.

The primary arm 32 carries a secondary arm 36 which is mounted, first for movement in a horizontal plane about a vertical axis passing through the free end of arm 32 and, secondly, for rotation in a vertical plane about a horizontal axis passing through and intersecting with the said vertical axis in the free end of arm 32. The end of the secondary arm 36 adjacent primary arm 32 carries a portion of the mounting mechanism and means by the operation of which movement in a vertical plane can be achieved.

The free end of the arm 36 carries a head 38 which performs the functions of grasping a tree, severing it from its stump and, when moved to the appropriate position providing the initial or first-stage feed to introduce the butt end of the severed tree through the debranching and debarking mechanism 33 into the internal mechanism carried by the primary arm 32.

FIG. 1 illustrates these functions. The left-hand head in FIG. 1 is shown in the act of grasping and severing a tree. Grasping arms are gripping a tree T between the arms and a base member while tree-shearing members S have severed the tree from its stump. The right-hand head shown in FIG. 1 is in the act of introducing a severed tree T into the debranching and debarking mechanism 33, the secondary arm 36 having moved from a position, perhaps similar to the position of the other arm shown in FIG. 1 so as to move the tree, while maintaining it in a vertical orientation from the position in which it grew to the position in which the tree is shown in associated with left-hand primary arm 32.

The tree-grasping arms are mounted upon a subassembly of the head 38. This subassembly is a slide which is capable of vertical movement relative to the head 38 so that when the tree is positioned above the debranching and debarking mechanism 33, the slide may then be moved in a vertically downward direction in order to introduce the butt end of the tree into the processing apparatus carried within the primary arm 32. Below the debarking and debranching mechanism 33 there is a main feed and guide roller mechanism which, when the tree has entered the apparatus a sufficient distance, will engage the tree and will take over from the slide arrangement carried by the head 38 so that the tree may then be released by the head which may then return to a position functionally similar to that of left-hand head in FIG. 1 so as to grasp, sever and lift a further tree for introduction into the processing apparatus of the primary arm 32.

The function of the processing apparatus carried within the primary arm 32 is to reduce the tree trunk to chips which are then blown through conduits into a container carried by the rear chassis 11 of the machine in a manner which will be described in greater detail below.

Although the preceding description has not taken pains to specifically distinguish between the primary arm 32, the secondary arm 36 and the head 38 carried by one side of the machine and identical equipment carried by the other side of the machine, it will be readily apparent from a consideration of FIGS. 1 and 2 that the primary arm, secondary arm and head of one side is duplicated by a primary arm, secondary arm and head on the other side of the machine and it will equally be apparent that the primary arm, secondary arm and head of one side of the machine operates independently of and simultaneously with the corresponding equipment carried by the other side of the machine. For this purpose, of course, the control center 24 will contain two operators, each in charge of the supervision of the operation of the apparatus associated with one side of the vehicle.

Before leaving this general description of the machine illustrated in FIGS. 1 and 2, it might be well to discuss, by way of example, some physical dimensions of the apparatus since some machine functions will be better understood when considered in the proper context of total vehicle size.

First of all, the machine illustrated is primarily intended for operation in the southern pine regions of the United States. Accordingly, the machine disclosed, being designed especially for operation in this area, will differ in some ways from a machine embodying the same invention but designed for operation in other areas where tree conditions, ground terrain and other factors may dictate certain changes. For this reason, the following dimensional figures should be considered as illustrative or representative and should not be construed in any way as limiting.

As illustrated, it is contemplated that the vehicle of FIGS. 1 and 2 will, including the payload contained in container 35 have a gross vehicle weight of something of the order of 180,000 pounds. The fore-and-aft distance between the axles of the front and rear chassis will be of the order of 24 feet and the transverse distance between vertical structural members 22 of the chassis will also be 24 feet. The maximum distance between heads 38 when they are extended in the transverse direction to their greatest extend will be approximately 70 feet. The tire diameter is contemplated at 10 feet, ground clearance at about 5 feet. The deck or floor of the control center 24 will be about 10 feet above ground and the level of the debarker-debrancher mechanism above the ground will be approximately 12 feet.

Engine Compartment

From these dimensions it can be seen that a vehicle of substantial size is contemplated and one which will be substantially immune to the terrain obstructions which might render travel difficult for vehicles of more conventional type and size.

The present invention contemplates the integration of subsystem modules as will be apparent in the following description of such components as the head 38, the secondary arm 36, the primary arm 32 and the engine compartment or pod. As illustrated in FIG. 3, the invention provides an engine compartment in the nature of a pod 50 which may be removably slung beneath the control center 24 carried by the forward chassis section 10. The entire pod 50 is suspended below the deck or platform 25 of the control center 24 by any suitable mechanisms which are diagrammatically illustrated at 52. Ideally, these mechanisms 52 will be capable of raising and lowering the entire pod 50 together with its contained apparatus. In this way, when engine maintenance is required, an entire pod 50 can be lowered, transported to a maintenance shop and replaced with a new or spare pod containing equivalent apparatus so that the operation of the entire machine is not unduly delayed. The engine pod 50 contains, by way of example, a diesel engine 53 coupled to and driving an electric generator 54 which will include known and necessary control gear. The diesel engine 53 is cooled by a radiator 55 through which air is drawn by means of a fan 56, fresh cooling air supply being provided by opening 57 which may also be seen more readily in FIG. 1. The output of generator 54 is distributed by known means to all of the electric functions of the machine and this power distribution is achieved by means of electrical conduits housed within structural members of the apparatus so that electrical cables are not exposed to possible damage by external agencies. The pod 50 may also contain an electric motor 58 (supplied with energy from generator 54) driving a pump 59 provides a source of pressurized hydraulic fluid in accumulator 60 from which the various hydraulic functions of the machine can be supplied. An exception with respect to these various hydraulic functions arises in the case of the heads 38 as will be explained below. Further, an electric motor 61 may be provided driving an air compressor 62 in order to provide a source of pneumatic pressure for those pneumatic functions of the machine. As shown, the air compressor and its motor 61 need not necessarily be carried within the pod 50 although, of course, they may be located therein if it is desirable to do so. Since it is the engine 53 which is most likely to require periodic maintenance, it is of principle importance that it be located in the droppable and exchangeable pod 50. Otherwise, conditions of space, convenience and maintenance requirements will generally dictate what other equipment is similarly located in pod 50.

From the preceding descriptions of the general machine configuration and of the engine compartment, it will now be appreciated that a large vehicle has been provided carrying an engine driving an electric generator which, in turn supplies electric power to, first of all, generate a source of pressurized hydraulic fluid and, second, to generate a source of pressurized air for the hydraulic and pneumatic functions of the machine. The electrical output of the generator will also serve to drive those electrical functions of the machine which will be described below.

Wheel Stations

As described with reference to FIGS. 1 and 2, each chassis section 10 and 11 is provided with two wheel stations, one on the left and one on the right-hand side of the machine. Each of these wheel stations is mechanically identical to every other wheel station and a typical wheel station is illustrated in FIG. 4, this being a section taken along line 4—4 of FIG. 2 and illustrating, in detail, the left rear wheel station of the machine illustrated in FIG. 1.

Figure 4:
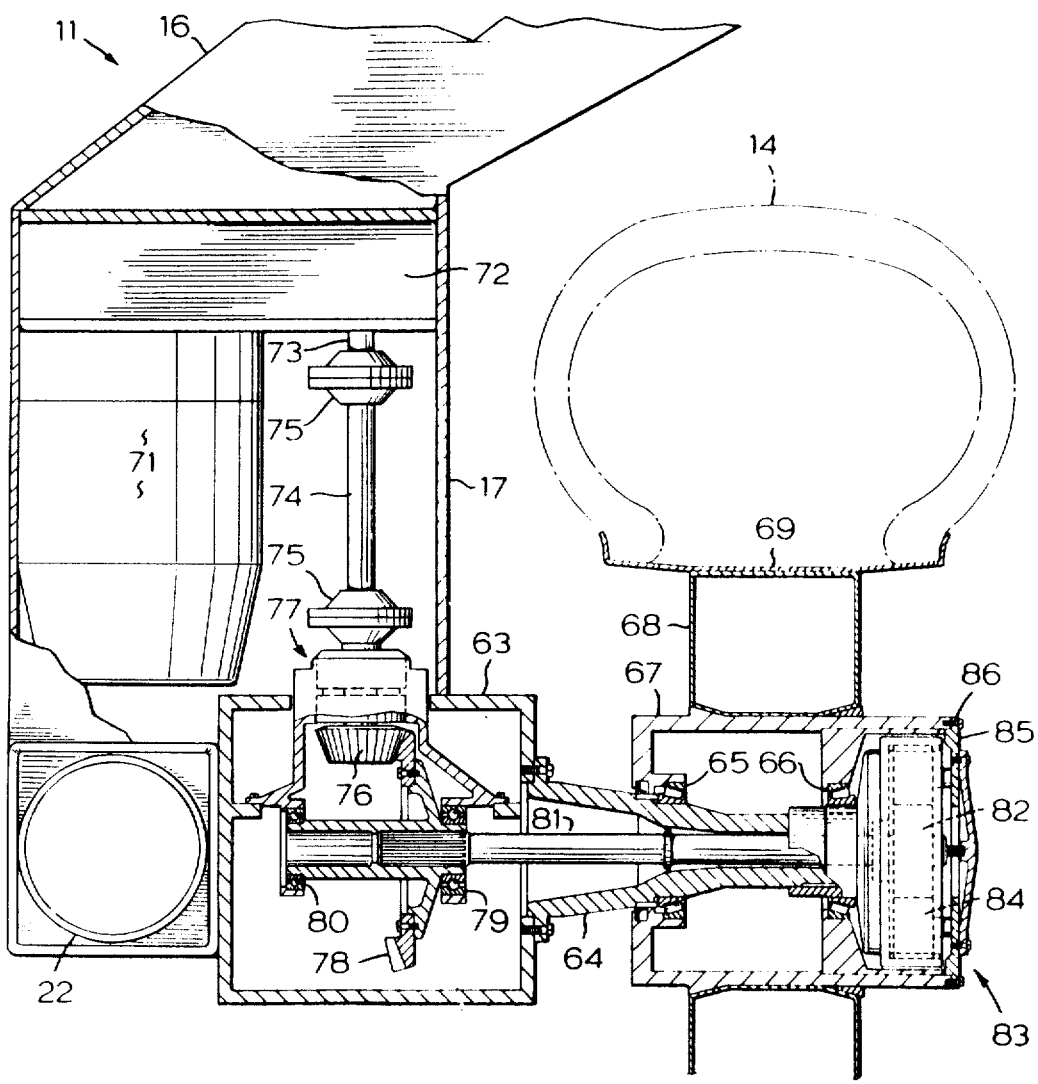
FIG. 4 is a sectional view of a typical wheel station and may be considered as being taken through section line 4—4 of FIG. 2.

The wheel station illustrated in FIG. 4 may be seen to be housed within the structural member 17 of the rear chassis section 11, section 17 being that portion which lies parallel to a corresponding portion (not seen) on the other side of the vehicle. A fragmentary showing of structural element 16 of the rear chassis section 17 is also included in FIG. 4.

Chassis section 17 terminates in a substantially square housing 63 to which is rigidly bolted an inwardly extending tubular wheel spindle 64 about which, by means of roller bearings 65 and 66, the wheel hub 67 is mounted for rotation. The wheel hub 67 supports a radially extending annular box section 68 which, in turn, carries the tire rim 69 which supports the tire 14.

The chassis section 17 houses an electric motor 71 which is provided with electrical energy by means of appropriate power conduits leading from generator 54 housed within the engine compartment or pod 50. Suitable control leads will extend between the engine 71 and the control center 24 in a known manner so as to give the operator within the control center 24 control over the direction and speed of operation of motor 71. An output shaft (not shown) of motor 71 will drive the input shaft (not shown) or a gearbox 72, the output shaft 73 of which drives, through a drive shaft and flexible couplings 74 and 75 respectively, a bevel gear 76 journaled for rotation in bearing 77 set in the wall of box section 63. Bevel gear 76 drives a second bevel gear 78 which is, in turn, supported by bearings 79 and 80 and which is splined to shaft 81 which extends through spindle 64 and drivingly engages a sun gear 82 of a planetary transmission 83. The planetary gears 84 of the planetary transmission 83 transmits power to end plate 85 which is bolted to the wheel hub 67 by means of bolts 86 and, in this way, wheel rim 69 and therefore, the entire wheel including the tire 14 may be rotated in either the forward or the reverse direction depending upon the direction of rotation of the motor 71.

An extremely high level of torque may be applied to the tire 14 by virtue of the fact that the rotation of motor 71 experiences a first speed reduction within gearbox 72, a second speed reduction by means of bevel gears 76 and 78 and a final reduction in the planetary gear system 83 before this rotation is applied to the wheel and tire 14.

As was described and as is clear from FIGS. 1 and 2, there are four wheels supporting the vehicle and each of the wheel stations is mechanically and in principle identical to the wheel station which has been described with reference to FIG. 4. Obviously, in a manner well known in the art, suitable controls will be provided to integrate the operation of the motors driving each wheel and the controls imposed in a known manner which will enable these wheels to rotate in synchronism if that is appropriate or to vary the speed of one wheel over the speed of another or provide more power to a wheel having a better tractive surface upon which to bear that is supplied to another wheel where traction conditions are poor. Such control systems may, indeed, be complex but all of them are well known and understood by those skilled in the art of the control and synchronization of electric motors of various kinds.

Center Joint And Vehicle Articulation Mechanism

Figure 5:
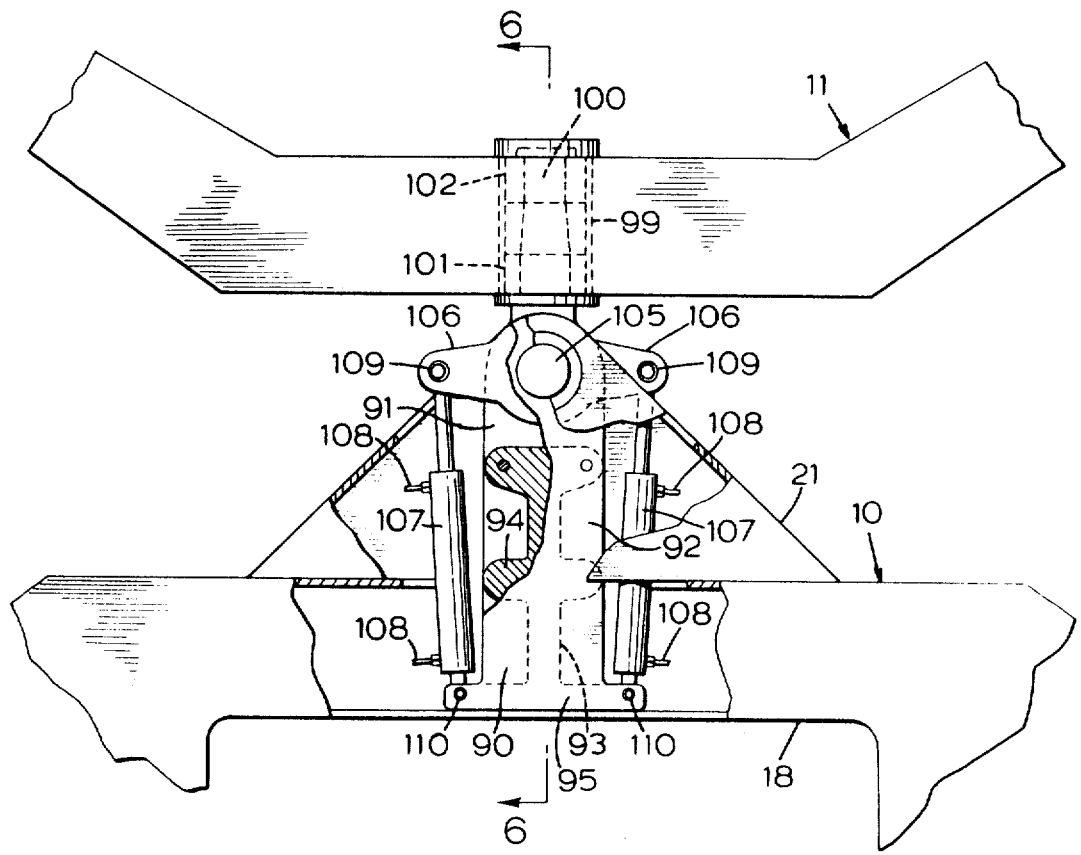
FIG. 5 is a fragmentary plan view, partly broken away, of the center joint about which one chassis section may be articulated relative to the other in order to provide vehicle steering.

The description which has preceded this heading has provided a vehicle having the general configuration of that shown in FIGS. 1 and 2 provided with a source of power in a droppable engine pod and has shown means for transmitting this power to the vehicle-supporting wheels to provide a vehicle which may move forwardly or rearwardly under the control of an operator located within the control center 24. Obviously, a vehicle of this kind must be steerable and, to this end, the center joint arrangement illustrated in FIGS. 5 and 6 has been incorporated between the front chassis section 10 and the rear chassis section 11. In FIG. 5, the front chassis section 10 is illustrated as carrying a rearwardly projecting housing 21 within which is located a massive joint casting 90. In general, the casting 90 is of I-beam configuration being provided with a lower web 91, an upper web 92 and a central spine 93. Further reinforcement is provided by introducing side lobes 94 which extend transversely of the central spine 93 and which contribute to the strength of the casting. Further, a baseplate 95 is provided by means of which the casting can be secured (e.g. by welding) to the box section frame member 18 of the front chassis section 10.

The rearward extremity of the casting is bifurcated as at 96 (see FIG. 6) and a vertically oriented bore 97 is provided through both the upper and the lower limbs of the bifurcated portion of the casting. Opening or bore 97 receives a bushing or bearing sleeve 98 for a purpose which will become apparent.

The rear chassis section 11 carries, in its central truncated portion 15, a longitudinally aligned bore 99 within which is journaled a rear trunnion 100 by means of journal bearings 101 and 102.

The forward end of the trunnion 100 is formed into an enlarged boss 103 through which extends a bore 104 and which, when it is positioned coaxially aligned with the openings in bushings 98, may receive a large central pin 105 which may be driven through bushing 98 in the upper limb of the bifurcated casting, through bore 104 in the trunnion and into bushing 98 in the lower limb of the bifurcated casting. By this means, it can be seen that the front chassis 10 may pivot relative to the rear chassis 11 about a vertical axis passing centrally through the pin 105 in a vertical direction and about a horizontal axis passing longitudinally through the trunnion 100 carried in its journal bearings 101 and 102. However, there is no freedom of movement about a horizontal axis transverse to the axis of the trunnion 100 and, accordingly, the vehicle is stably supported at its center joint in the configuration shown in FIGS. 1 and 2.

In order to steer the vehicle, the central boss 103 of the trunnion 100 is provided with a pair of transversely or laterally extending arms 106 and hydraulic actuators 107 having fluid inlet and outlet ports 108 are provided reacting between pivotal mountings 109 on the arms 106 and pivotal mountings 110 on the base 95 of the casting.

From a consideration of FIG. 5 it will be apparent that an extension of one cylinder coupled with a retraction of the other will cause chassis 10 to be articulated with respect to chassis 11 about a vertical axis thereby providing for steering of the vehicle in a manner which is well understood in connection with articulated vehicles of other kinds. No twisting or bending movements are applied to the cylinders 107 since the trunnion 100 upon which the arms 106 are carried remains stationary (about a horizontal axis) with respect to front chassis section 10 while allowing rear chassis section 11 to rotate about the trunnion 100.

Pivot Walk Station

The vehicle so far described provides for powered and steerable movement in both a forward and reverse direction in what may be termed "a conventional manner." In other words, motive power is applied to the supporting wheels of the vehicle in order to drive it in either the forward or reverse direction and steering is achieved by articulating the forward and rear chassis relative to one another.

The vehicle is also provided with an entirely separate and independent method of locomotion and means for carrying out this method, these means being entirely independent of the ability of the wheels or any of them to obtain tractive footing upon the terrain to be traversed.

As best illustrated in FIGS. 1 and 2 in respect of the rear chassis section 11, each wheel station has associated therewith a vertical column or frame member the outer housing of which is in the configuration of a tube of square cross section. This frame member bears reference numeral 22 in FIG. 2 and supports the inwardly sloping structural member 23. The forward chassis section embodies an identical vertical column the upper end of which may be seen clearly in FIG. 2 although the major portion of this column (as seen in FIG. 2) is housed within the inner end of the primary arm 32. In fact, each of the four wheel stations associated with the vehicle embodies a vertical column member 22 and each of these columns contains the equipment which is illustrated in FIG. 7.

Figure 7:
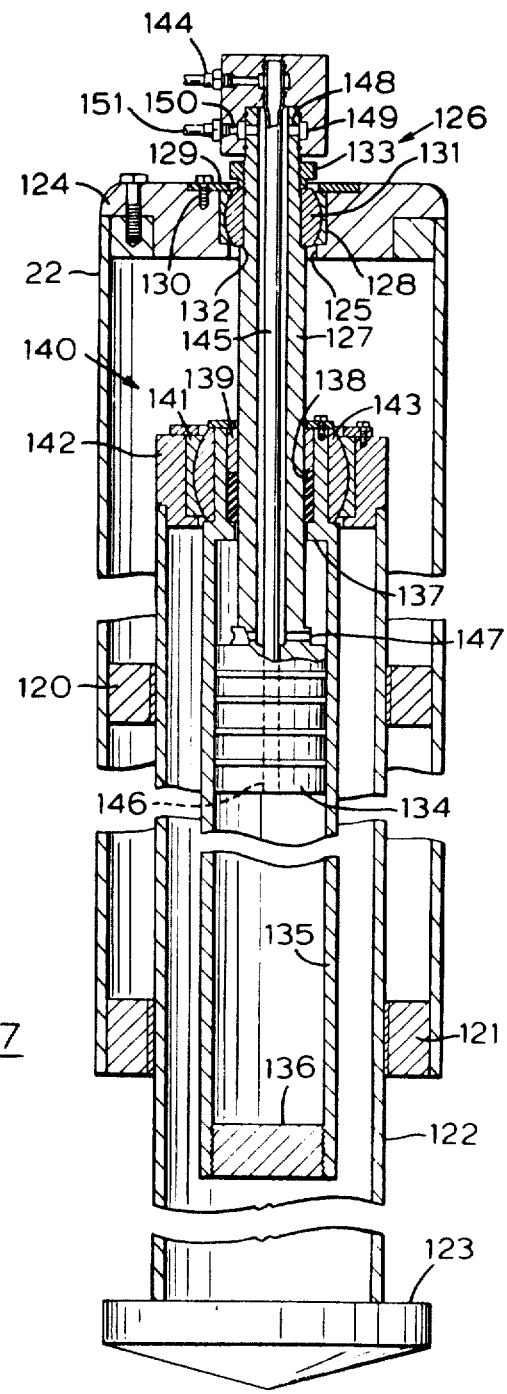
FIG. 7 is a vertical section taken through a typical "pivot-walk" station such as, for example, that indicated along section line 7—7 in FIG. 1.

In FIG. 7 the vertical column member 22 of any one of the wheel stations is viewed in axial section with the structural column member 22 being shown as an outer envelope or shroud for the mechanism contained therein. The member 22 is provided, on its inner surface, with two vertically spaced bearings 120 and 121 which support, for sliding movement, a vertical column 122 of cylindrical configuration. The lower end of column 122 is provided with a foot 123 and both the lower extremity of the column 122 and its associated foot 123 may be seen in FIG. 2.

The upper end of structural member 22 is closed by a cap member 124 which is secured, by any suitable means, to member 22. Cap member 124 is centrally bored at 125 and fitted within the bore 125 is a spherical bearing 126 by means of which a hollow piston rod 127 is secured to the cap 124. Piston rod 127 is restrained against axial movement relative to the cap 124 by the engagement between the relevant components of the spherical bearing 126. The concave element 128 of the spherical bearing is fixed to the cap 124 by means of cover plate 129 and bolts 130 while the convex portion 131 of the spherical bearing engages a shoulder 132 on the rod 127 at one end and, at the other, is retained by a nut 133 threaded onto the end of the piston rod 127 which extends upwardly beyond the cap 124. Thus, although the piston rod 127 is firmly fixed against axial displacement relative to the cap 124 it is capable of limited angular displacement relative thereto in any plane and is, in addition, free to rotate within the spherical bearing.

The lower end of piston rod 127 is provided with a piston 134 carried within a cylinder 135 which is sealed at its lowermost end by a plug 136 threaded into the bore of the cylinder 135. At its upper end, the cylinder is partially closed by an inwardly extending shoulder 137 which defines a central and axially aligned aperture through which the piston rod 127 passes beyond the upper end of the cylinder 135. Surrounding the piston rod 127 as it passes out of the cylinder 135 is first of all, a packing or sealing element 138 and, secondly, a bushing or sliding bearing 139. The upper end of the cylinder 135 is secured to the upper end of a column 122 by a spherical bearing which is similar both in construction and in function to the spherical bearing 126 which has already been described. The spherical bearing 140 connecting the column 122 with the cylinder 135 comprises a concave member 141 secured to an end cap 142 at the upper end of the column 122 and a convex member 143 secured to the upper end of the cylinder 135. The concave and the convex components of the spherical bearing 140 are secured in position by retaining rings and mounting bolts which have not been separately identified by reference numerals but which are clearly visible and whose function is clearly apparent from FIG. 7. The effect of the spherical bearing 140 is to fix cylinder 135 to column 122 against axial displacement of one part relative to the other but to permit limited angular displacement between the cylinder and the column and to permit the column to rotate relative to the cylinder and for both the column and the cylinder to rotate relative to the piston and the piston rod thereby completely isolating and insulating the cylinder 135 and the piston 134 and the piston rod 127 from any bending, twisting or other distorting forces which might otherwise be transmitted to these components by the operation of the device which will be subsequently explained.

Hydraulic fluid to actuate the cylinder piston combination is introduced below the piston 134 by means of inlet port 144 which leads fluid to a central conduit 145 which passes through an axial bore in piston rod 127 and discharges fluid at point 146 below the piston 134.

The fluid connection to the area above the piston 134 is obtained through radial ports 147 which extend between the outside of the piston rod 127 and the annular space between the interior bore of piston rod 127 and the central tube or conduit 145 passing therethrough. At the upper end of the piston rod 127 a radial port 148 leads to an annular gallery 149 which is, in turn, connected by radial port 150 to conduit 151.

Admission of hydraulic fluid to conduit 144 and thence through conduit 145 into the area below piston 134 will cause cylinder 135 to descend and will carry with it, therefore, the column 122 and the foot 123. As the cylinder and column are descending, of course, fluid will be exhausted from the area above piston 134 through ports 147 and, eventually, conduit 151.

Similarly, the raising of the column 122 can be achieved by introducing pressurized fluid through conduit 151, the hollow piston rod 127 and radial ports 147 to the area above the piston 134 thereby causing the cylinder 135 to rise and carry with it column 122. During this function, of course, fluid will be exhausted from the lower portion of the cylinder 135 along the route already described.

The function of this pivot-walking cylinder will be described in substantially greater detail below the reference to the manner in which the entire machine may be advanced by predetermined increments through the forest region so as to provide the tree grasping, severing and processing apparatus with an accurately reproduced repetitive cycle which it may perform with optimum efficiency. The principle by means of which the vehicle is advanced in association with the pivot-walking arrangement illustrated in FIG. 7 has been described and claimed in detail in my earlier patent application Ser. No. 530,890 of which this is a continuation-in-part. In essence, the system provides for the "walking" of the vehicle in a manner which is made possible by the articulated chassis construction and the provision of pivot-walking apparatus at each wheel station.

Consider, as an example, the machine configuration as it appears in FIG. 2. Let us further assume that terrain upon which the vehicle stands in FIG. 2 is firm and solid and that, therefore, the foot 123 which is shown in a descended position has engaged the ground to a degree sufficient for the foot alone to support the weight of the vehicle associated with that wheel station. The feet and columns associated with all three other wheel stations will be raised and out of engagement with the ground and, although it is immaterial, let us assume that no tractive energy of any kind is being supplied to any one of the four wheels. If, under these conditions, the hydraulic cylinders associated with the center joint are actuated so as to cause the center joint of the vehicle to move to the right or, in other words, to move in a counter clockwise direction about foot 123 and column 122 when viewed in FIG. 2, the resulting movement, of necessity, cause the corresponding foot on the right-hand side of the vehicle when seen in FIG. 2 to advance forwardly. Once this movement is complete, the foot 123 (as shown in FIG. 2) will be raised, the corresponding foot on the right-hand side of the vehicle will be lowered into engagement with the ground and the center joint of the vehicle articulated in the opposite direction thereby causing the foot 123 (now raised) to move in a clockwise arc about the foot on the opposite side of the vehicle thereby advancing the entire chassis by a further increment. During this operation the rear chassis section 11 performs no function other than to resist sideways movement of the vehicle which is present as a result of the torque which is applied about the center joint by the actuation of the hydraulic cylinders 107. This walking function has been described in detail in my copending application Ser. No. 530,890 and has been claimed therein and although the walking function will be described in further detail below, the present description is believed to be adequate to support the detailed description of the pivot-walking apparatus shown in particular in FIG. 7 and its association with the overall vehicle configuration of FIGS. 1 and 2.

The pivot-walking cylinders shown in FIG. 7 serve other functions in addition to the walking function which has just been briefly discussed. For example, by moving all four or at least two of the columns 122 and the associated feet 123 down into engagement with the ground, the vehicle can be converted into an extremely stable platform from which tree grasping, severing and processing apparatus can be carried out. Further, the establishment of a stable platform by means of the columns 123 enables a reference plane to be established, parallel to the ground, either above or below which the tree-shearing function can be carried out at a point previously determined with reference to this horizontal plane.

Further reference to the location of this horizontal reference will also be made at a later stage in this disclosure.

The Tree Grasping, Severing and Processing Arms

The Primary Arm

The primary arms 32 (see FIGS. 1 and 2) serve two functions. First, they constitute one element of the tree grasping, severing and processing arms and, in that function, act simply as mechanical links supporting secondary arms which, in turn, support heads, the linkage being composed of these elements being mounted for movement in horizontal and vertical planes so as to enable heads 38 to grasp and sever any tree located within the area swept by the primary and secondary arm linkages.

Secondly, the primary arm 32 houses tree-processing apparatus including the debarking and debranching mechanism, the main feed rollers and the chipping mechanism. This function and the apparatus for carrying it out will be described in greater detail below. For the time being, it is sufficient to consider the primary arm 32 as simply being one element of the linkage which provides the mobility for the heads 38. In the following detailed description, reference will be made only to the left-hand primary arm 32 shown in FIGS. 1 and 2. It will be understood, of course, that the same description applies to the right-hand primary arm which can also be seen in these figures.

As was mentioned earlier in this disclosure, the left front wheel station, like all other wheel stations, is provided with a vertical structural column or pillar 22 which can be seen in dotted lines in FIG. 8. A stationary bearing cone 160 is fixed to the column 22 and presents a downwardly facing conical bearing surface 161. A similar conical bearing surface 162 is upwardly directed from a lower bearing cone 163, the element 163 also having an upwardly extending sleeve 164 fixed to the column 22 and provided with an externally toothed ring gear 165 for a purpose which will become apparent. The primary arm 32 comprises a boxlike member of the configuration shown in FIGS. 1 and 2 and formed of an external skin 166 together with internal struts and bracings as may be required and which are not illustrated in FIG. 8. One end of the primary arm 32 embraces the column 22 and the bearing cones 160 and 163 carries, adjacent bearing cone 160 a series of rollers 167 arranged about the periphery of the downwardly facing conical surface 161 so that their edges will bear against this surface. Similarly arranged rollers 168 are carried by the member 32 adjacent the lower upwardly facing bearing surface 162 so that the series of rollers 167 and the series of rollers 168 will support the primary arm 32 for rotation in a horizontal plane about a vertical axis passing through the common axis of the bearing cone surfaces 161 and 162.

Carried within the primary arm 32 is an electric motor 169 driving through a gear reduction unit 170 to a worm gear 171 which is in engagement with the externally toothed ring gear 165. It is to be noted that the ring gear 165 is mounted upon standing or stationary structure while the motor, gearbox and worm 169, 170 and 171 respectively are carried by the primary arm 32. Accordingly, energization of the electric motor 169 in one direction will cause the rotation of the worm 171 which will, accordingly, crawl around the ring gear 165 thereby imparting similar movement to the primary arm 32 in its horizontal plane about the vertical common axis of conical bearing surfaces 161 and 162.

It will be seen that the pivot walk apparatus which was described in detail with reference to FIG. 7 is housed within the column 22 about which the primary arm 32 is mounted for rotation in its horizontal plane. Accordingly, when the pivot walk apparatus of FIG. 7 is extended downwardly to engage the ground, it will provide a very firm and stable support for primary arm 32 in its movement through its horizontal plane about its vertical axis.

In order to energize motor 169 and other equipment carried by the primary arm and by the secondary arm and by the head as well, it is necessary to lead electric power from the generator 54 into the primary arm 32 and beyond. To this end, a cable 172 is provided (see also FIG. 1) which travels from the generator 54 through the structural members associated with the front chassis section 10 into the structural member 23 from which it emerges immediately above the bearing cone 160. The cable 172 passes through an aperture formed in the bearing cone 160 and, within the primary arm 32, is helically wound about the column 22 in the area immediately below the upper series of supporting rollers 167. The number of turns in the helix 173 is sufficient to enable the primary arm 32 to move in its horizontal plane from an extreme position in one direction to an extreme position in the opposite direction. At one extreme position, the helix 173 will be more or less tightly wound around the column 22 and, at the other extreme position, the helix 173 will have loosened and will have expanded within the space provided about the column 22 within the primary arm. In this way, the rotation of the primary arm 32 about its vertical axis does not disturb the electrical continuity of the cable 172 and no complicated mechanisms such as sliprings or sliding contacts are required. Obviously, the cable 172 will be a multiple-conductor cable providing electric power for motor 69 and for motors which will be later described and, in addition, will provide control conduits by means of which the operation of these motors may be controlled.

For purposes which will become apparent below, a second conduit 174 is similarly brought into the primary arm 32, coiled about the column 22 together with conduit 172 and thereby brought into the interior of the primary arm 32. This second conduit 174 carries compressed air from the air compressor 62 shown in FIG. 3.

For the time being, the remainder of the mechanism contained within primary arm 32 will be ignored except for a structural annulus 175 about which is mounted, by means of suitable bearings 176, an annular supporting ring 177. The configuration of ring 177 can best be seen with reference to FIGS. 18 and 19. The ring 177 is provided, at one point on its periphery, with a radially extending boss or projection 178 which, at a point spaced from the annular portion 179 of the member 177 enlarges into an outwardly opening spigot 180. The annular portion 179 of the member 177 is provided with externally formed gear teeth 181 over a portion of its circumference and, over a diametrically opposed portion of its circumference is provided with a groove 182 set in its edge surface. The groove 182 communicates with a passage 183 which extends axially through the spigot 180 along a radius of the member 177, the passage then curving outwardly at 184 to join the groove 182 on the external edge of the member 177.

The external surface of the spigot 180 is provided, at 185 with externally formed gear teeth and, at 186, with a shallow peripheral groove, both for purposes which will be later described.

The Secondary Arm

Returning to FIG. 8, the annular ring member 177 can be seen to be supported by standing structure 175 which is, in turn, firmly supported by the structural components of the primary arm 32. Within the primary arm 32 is electric motor 187 which drives, through a gear reduction box 188, a worm gear 189 which is in engagement with gear teeth 181 of the ring member 177. Since the electric motor, the gearbox and the worm gear 189 are carried by the primary arm 32 and the ring 177 is mounted for rotation therein, energization of the electric motor and the worm gear will cause the ring member 177 to rotate about a vertical axis and will cause the spigot 180 supported by the boss or extension 178 to move in an arc through a horizontal plane along slot 190 (see FIG. 2) formed in the skin of the primary arm 32 at the mounting point for secondary arm 36. In this way, the mounting point for the secondary arm 36 can traverse an arc in a horizontal plane about a vertical axis which, incidentally, can be seen to coincide with the vertical axis of the debranching and debarking mechanism 33 carried by the free end of the primary arm 32. The relationship between these various components in the primary arm and the remaining mechanism carried by secondary arm will be elaborated upon below.

Turning now to FIGS. 1 and 2, the secondary arm 36 can be seen to comprise a main, central structural member 200 which merges with an enlarged end 201 adjacent primary arm 32 and an enlarged end 202 adjacent the head 38. Returning now to FIG. 8, it can be seen that the enlarged end 201 of the secondary arm 36 is provided with a spigot 203 received within the spigot 180 of the ring member 177 (see FIGS. 18 and 19). Further, the enlarged end 201 of secondary arm 36 mounts an electric motor 204 which drives through a gear reduction box 205 to a worm gear 206 which is in engagement with the external gear teeth 185 carried by the spigot 180 of the ring member 177.

Energization of the electric motor 204 will rotate the worm gear 206 and cause it to crawl about the toothed periphery 185 of the spigot member 180 and since the electric motor, its gearbox and worm are fixed relative to the secondary arm 36, this movement will cause the arm 36 to move in a vertical plane about a horizontal axis, this horizontal axis constituting a radius of the ring 177 and, therefore, intersecting with the vertical axis about which ring 177 itself is rotated or rotatable.

In order to bring electric power and control leads to the secondary arm 36, the arrangement which is schematically shown in FIGS. 18 and 19 is employed. The necessary number of electrical conduits from cable 172 is brought, within primary arm 32, to a point adjacent the periphery of ring member 177 where a sufficient length is spooled about drum 207. The cable 172A is led from the spool 207 into passage 184, through passage 183 is coiled as indicated at 208 within a hollow portion formed in spigot 203 of the secondary arm 36. A consideration of FIGS. 18 and 19 will make it apparent that as the ring member 177 is rotated in the direction of arrow A in FIG. 18, cable 172 will be drawn from spool 207 and laid into the groove 182. The angular movement of ring 177 is, of course, limited less than 360° and is, indeed, limited to something of the order of 120°. Accordingly, the gear teeth 181 do not extend around the entire periphery of the ring 177 but cover only the 120° movement together with a slight additional extent at either end so as to provide a safety factor. Accordingly, it is possible to provide a diametrically opposed groove 182 which is of an extent at least equal to the angular extent of the gear teeth 181 so as to fully accommodate within the groove 182 the cable 172 drawn from spool 207 during the maximum rotation of the ring 177. It is clear that rotation in one direction will draw cable 172 from the spool 207 while rotation in the opposite direction will permit the spool 207 which will be spring loaded by a spring such as 209, to take up the cable 172 from the groove 182 as the ring rotates in the direction opposite to that indicated by the arrow A in FIG. 18.

In this way, sliprings or sliding contacts to carry electrical power into the interior of secondary arm 36 are avoided and the movement of the ring 177 in the horizontal plane is accommodated. Movement of the secondary arm 36 in the vertical plane is accommodated by the coil or cable 208 located within the cavity of the spigot connection between the primary arm 36 and the ring member 177. Power for electric motor 204 and control leads therefore will be contained within cable 172A thereby placing the electric motor 204 under the control of the operator located in the control center 24 and, in turn, placing the position of the secondary arm 36 in the vertical plane at his control.

The outer end 202 of the secondary arm 36 is provided with a fixed spindle 210 extending at right angles to the longitudinal axis of the secondary arm 36 and lying, therefore, parallel to the radius of ring 177 which, in turn, constitutes the axis of the spigot 180 about which the secondary arm is mounted at that end lying adjacent the primary arm 32. The spindle 210 is provided with bearings 211 which support a hub 212 carrying a mounting collar 213 which, in turn, carries the head 38 in a manner which will become apparent with reference to FIGS. 9 and 10. The hub 212 is free to rotate about the spindle 210 but is forced to maintain a fixed angular relationship with respect to the spigot 180 of the ring 177 by means of a unique arrangement which will now be described.

The spigot 180 carries, in addition to the peripheral gear teeth 185, a shallow peripheral groove 186 as can be seen in FIG. 18. Entrained about the boss 178 and lying within this groove 186 is a strong metal (e.g. titanium) tape or belt 215, the belt extending from the end 201 of secondary arm 36 to end 202 while passing through the tubular members 214 which lie parallel to but slightly spaced from the structural member 200 of the secondary arm 36. At the outer end of the secondary arm 36 in enlargement 202 the metal belt 215 is entrained about hub 212 in a shallow groove 216 provided for that purpose. The belt is quite taught about the hub 212 and boss 178 and is, by any suitable means, firmly anchored to both the boss 178 and the hub 212 so that it may not slip relative to either element. Accordingly, as the secondary arm 36 rotates in its vertical plane about its horizontal axis, one or the other of the runs of the belt 215 will be placed in tension and will cause the hub 212 to maintain a fixed and constant angular relationship relative to the boss 178.

As can be seen from FIG. 8, an extension of electrical cable 172 and 172A leads from coil 208 through the secondary arm and passes, at 172B through an axial bore in the spindle 210 so as to enter the head 38.

The Head

Referring to FIG. 9, the head 38 is shown from the rear or nonoperative side in a cutaway perspective view which clearly illustrates the main structural member 220 which constitutes the base or support for the head mechanism. The main structural member 220 carries a cylindrical projection 221 upon which is secured a mounting flange 222 by means of which the head 38 may be securely bolted to mounting flange 213 carried by hub 212. It will be noted that, as stated above, the angular position of the hub 212 remains fixed relative to the boss 178 of the annular member 177 regardless of the position of the secondary arm 36. In particular, the arrangement is such that the longitudinal axis of the head 38 remains vertical at all times and in all positions of the head. Referring to FIG. 1, it can be seen that when the secondary arm is substantially horizontal, the head 38 is vertical and that this vertical orientation of the head 38 is maintained even when the secondary arm 36 is also vertical as is the case with respect to the right-hand secondary arm 36 shown in FIG. 1.

The main structural member 200 of the head 38 is provided with a central groove 223 in the side edges or faces of which are formed a pair of opposed smaller grooves 224. Grooves 223 and 224 extend the full length of the member 220 and at the upper and lower ends of the member 220 they are enclosed by end plates or caps 225. A slide member 226 is formed in a substantially C-shape having a forward web 227, a pair of side flanges 228 and a pair of short rear flanges 229. The structural member 220 is provided with a pair of oppositely directed outwardly extending parallel ways 230 which are embraced by the forward web 227 and flanges 228 and 229 of the slide member 226 and, accordingly, the slide member 226 is securely mounted upon the main structural member 220 but is free to slide along it in both senses of the vertical direction. The forward web 227 of the slide member 226 encloses the groove 223 in the main structural member 220 and within this groove is mounted a hydraulic cylinder 231 which is rigidly fixed and attached to the main structural member 220 by means such as the bolts illustrated at 232. The hydraulic cylinder 231 is provided with a single piston (not visible in FIG. 9) having two piston rods 233, one extending upwardly and one extending downwardly from the central piston and both passing out through end walls in the cylinder 231. Each piston rod 233 carries at its free end, a mechanism comprising a transverse block 234 having outwardly extending stub shafts 235 and mounting, at each end of the block 234, a chain sprocket 236. The stub shafts 235 extend outwardly beyond the chain sprockets 236 and ride in the grooves 224. The chain sprockets 236 each carry a chain one end of which is secured at 237 to the cylinder end cap which is, in turn, secured to the main structural member 220 of the head 38. Thus, each end of each chain is firmly anchored to the structural member 220 and the chains 238 and then entrained about the sprockets 236 and pass downwardly to be entrained about the sprockets 236 carried by a similar fitting at the end of the lower piston rod 233 as shown in dotted lines in FIG. 9.

At some point in the run between the upper sprockets 236 and the lower sprockets 236 the chains 238 are secured to the inner surface of the forward web 227 of the slide 226. For example, there is shown at 239 a mounting block carried by the slide member 226 to which the chain 238 is secured by means such as bolts 240. There may be as many mounting points as is deemed necessary and, of course, both chains 238 will be similarly secured to the side member 226.

By means of this arrangement, if fluid is admitted to the upper end of cylinder 231 and withdrawn from the lower end, the piston within the cylinder will move downwardly and the chain sprockets 236 at the upper end of upper piston rod 233 will also move downwardly as will sprocket 236 carried by the lower piston rod 233. The mounting points of chain 238 upon the slide 226 will also move downwardly but through a distance equal to twice the distance traversed by the piston within the cylinder and by this means, the travel of the piston within the cylinder 231 may be multiplied by two as this movement is transmitted to the slide 226.

The slide member 226 also carries the tree-grasping mechanism which can be clearly seen in FIG. 9 and which comprises a stationary and fixed right-angled clamping component having a first flange 250 parallel to and secured to the slide 226 and a second flange 251 extending therefrom at right angles and adjacent one edge of the slide 226. At two vertically spaced points along the flange 251 there are provided a pair of parallel mounting brackets comprising ears 252 and 253 for the upper elements and ears 254 and 255 for the lower elements. A tree grasping arm 256 is pivotally mounted by means of pin 257 to the free end of the ears 254 and 255 and an hydraulic cylinder reacts between pivotal mounting 258 on the ears 254 and 255 and pivotal mounting 259 on an end of arm 256. It will be seen that extension of the hydraulic cylinder 260 will cause the movement of arm 256 towards the right-angled flanges 250 and 251 and will enable these arms to securely grasp and clamp a tree against the slide mechanism so as to be held firmly in position by the head.

At the lower end of the head 38 is housed the tree-shearing mechanism by means of which a tree grasped by the head can be severed from its stump. This mechanism is most clearly illustrated in FIGS. 10 and 11 to which reference should now be made.

Tree-Shearing Mechanism

The lower portion of head 38 is provided with a pair of lateral extensions within the housing, these extensions bearing reference numeral 270 in FIG. 10. Secured rigidly within the housing of the head 38 is an hydraulic cylinder 271 the construction of which can better be seen in FIG. 11. The hydraulic cylinder 271 contains two pistons 272 and 273 which define two fluid compartments 274 and 275 respectively at opposite ends of the cylinder 271. The central portion between cylinders 272 and 273 does not contain hydraulic fluid but is occupied by a piston rod joining the two pistons 272 and 273, the piston rod being provided with rack-type gear teeth 276 over substantially its entire length. These gear teeth extend entirely around the circumference of the piston rod 277 so that angular displacement or even rotation of this piston rod 277 will not disengage the teeth 276 from the cooperating teeth of a pair of gears 278 and 279 which are keyed to shafts 280 and 281 respectively. It can be seen, therefore, that movement of the pistons 272 and 273 in a direction axially of the cylinder 271 will produce simultaneous rotation of gears 278 and 279 and will, accordingly, produce simultaneous rotation of shafts 280 and 281 since the gears 278 and 279 are keyed thereto.

Also keyed to shafts 280 and 281 are a pair of chain sprockets 282 and 283 in the case of shafts 280 and 284 and 285 in the case of shaft 281. Entrained about these sprockets are a pair of chains which are then entrained about cooperating sprockets 286 and 287 so that rotation, for example, of gear 278 will produce corresponding rotation in sprockets 282 and 283 and cause chains 288 and 289 to rotate sprockets 286 and 287 which are keyed to a mounting shaft 290 to which, in turn, is keyed to hub 291 of the tree-shearing arm only a portion 292 of which is seen in FIG. 10. The arrangement which is most clearly shown to the right-hand side of FIG. 10 is, of course, duplicated on the left-hand side thereof so that at the lower end of each head 38 there is provided a pair of tree-shearing arms 292 as can be seen at various places in FIGS. 1 and 2.

Referring now to FIG. 1, it can be seen that in association with the right-hand head 38 illustrated in this figure the tree-shearing arms extend upwardly in a "cocked" position with the arms 292 lying more or less parallel to the head 38. The left-hand head 38, however, shows the tree shears generally indicated by reference character 42 in FIG. 1 as extending downwardly in the tree-shearing position, the shears having been driven downwardly to this position by the actuation of the hydraulic cylinder 271 shown in FIG. 11 so as to move pistons 272 and 273 upwardly in the direction of the arrow thereby causing the rotation of the associated gears and sprockets in order to produce the tree-shearing function.

Head Power Supply

It will be noted that the previous description of the primary arm 32 and the secondary arm 36 provided only for the access of electrical power to the head 38 by means of cable 172B which entered through spindle 210. A consideration of FIG. 9, however, will disclose that there is a substantial amount of space within the housing 300 which provides a rear skin over the main structural member 220 of the head 38. Within this housing 300 is provided an entirely self-contained hydraulic power supply for the hydraulic functions of the head which include the operation of the slide actuating cylinder 231, the tree grasping cylinder 260 and the shear operating cylinder 271. This self-contained hydraulic power pack is schematically illustrated in FIG. 23 and is powered by an electrically driven motor 301 driving a positive variable displacement pump 302 drawing hydraulic fluid from a reservoir 303 and feeding, through a check valve 304 to an accumulator 305. Hydraulic fluid under pressure from the accumulator is available through line 306 to valve A which controls the operation of the grasping cylinders 260. Pressurized hydraulic fluid from the accumulator is also available through line 307 to valves B and D to operate the slide cylinder 231 and, finally, hydraulic fluid under pressure is available through line 308 and valves C and E to operate the shearing cylinder 271.

Valves A, B and C may be more or less conventional valves to determine both whether or not fluid enters the relevant cylinders and, if so, in which direction. Valves D and E are flow control valves which determine the rate of flow at which fluid may actuate the cylinders. It is relatively unimportant to control the rate of actuation of cylinders 260 which grasp the tree and clamp it to the slide carried by the head 38 provided that this operation can be carried out with moderate speed and efficiency. As will become apparent later, however, the rate at which the slide moves downwardly to initially feed the tree into the processing apparatus may be critical and for this reason a flow control valve is necessary in order to provide a feed rate which will optimize the power consumption of the processing apparatus.

Similarly, the rate at which fluid is supplied to the shearing cylinder 271 may be critical in some cases and is always important. hen the apparatus is called upon to shear a tree of small diameter, the flow rate to cylinder 271 will be lower than is the case when the apparatus is called upon to shear a tree of large diameter. It will be noted that the arrangement provided in the head lends itself to the automation of this function in that tree diameter can be readily sensed by the position of the arm 256 which grasps that tree in the tree grasping mechanism and the measure of tree diameter sensed by the arm 256 can then be readily fed back to control the setting of flow control valve E in order to determine the flow rate at which fluid will be admitted to cylinder 271 in order to control the energy supplied to the tree shears in accordance with the sensed tree diameter.

The operative or tree shearing end of arms 292 which cannot be seen in FIG. 10 is shown in greater detail in FIG. 12 and may also be seen in FIGS. 1 and 2. The shearing or cutting end of the tree shearing arms 292 comprises a heavy weighted portion 310 carried by the free or outer end of arm 292. The weighted portion 310 is recessed at 311 and within this recess is fitted a removable and exchangeable tree-shearing shearing blade 312. The size of the recessed portion 311 is such that when the two tree-shearing arms occupy the position shown in association with the left-hand head in FIG. 1, the combined area of the recesses 311 is adequate to accommodate the trunk of the largest tree which the machine contemplates encountering. In the environment in which the machine is presently contemplated as operating, the average tree diameter will be approximately 9 inches but the machine will be capable of accommodating trees ranging in size from a minimum of 4 inches in diameter to a maximum of approximately 18 inches in diameter. It will be appreciated that in order to sever a tree by means of a single blow delivered by a pair of opposed oppositely swinging shearing blades 312, a substantial amount of energy will be required. This energy is, of course, supplied in the form of pressurized hydraulic fluid entering cylinder 271 and causing the rapid displacement of the pistons 272 and 273 with the consequent high acceleration in gears 278, the sprockets associated with those gears on their shaft and transmitting this energy to the shearing arms 292 through chains 288 and the sprockets associated with the shaft 290 carrying the shearing arms. The shearing arms 292 are highly resilient so that a considerable "whip" action will be obtained with the weighted blades 312 reaching their highest velocity at the lower portion of their downward swing where they encounter the tree. The weighted blades will encounter the tree from opposite sides simultaneously and will in one whip, almost instantaneous blow sever the tree from its stump so that the tree may then be moved, while remaining in a vertical position clamped to the head 38, from the stump to the place within the processing apparatus of the primary arm 32 in a manner which will be clear from a consideration of FIG. 1.

Tree-Processing Apparatus

The preceding description of the primary arm as a structural member constituting one component of the arm linkage supporting the head 38 did not deal in any way with the tree-processing apparatus which is also contained within the envelope of the primary arm 32. This tree-processing apparatus includes a debranching and debarking mechanism and a chipping mechanism by means of which the severed tree may be stripped of its bark and branches and the trunk reduced to chips which will serve as a suitable raw material for a pulp and paper manufacturing operation.

Turning first to FIGS. 1 and 2, the primary arm 32 is shown as mounting, at its outer end, a debarking and debranching apparatus shown generally at 33. The debarking and debranching apparatus 33 embodies three debarking and debranching tools 320 which are carried by rotating plate 321 which rotates in the direction of arrow C in FIG. 2. The tools 320 may be displaced so that their radially inner ends spread apart to a maximum opening into which the butt end of a tree may be introduced, the diameter of this maximum opening being approximately 18 inches. They may be adjusted to close in to run upon the surface of a minimum sized tree of approximately 4 inches in diameter. The action of the radially inner ends of the tools 320 upon the bark of a tree trunk will remove the bark which will enter the hollow body of each tool 320 and be flung outwardly by centrifugal force to distribute the bark over the ground.

Turning now to FIGS. 8 and 21, the debarking and debranching mechanism 33 is seen housed within a slight upward enlargement of the primary arm 32 which occurs with the sloping wall 322. The entire debarking and debranching mechanism is carried by baseplate 323 which is slidably mounted in was carried by the structural members of primary arm 32 in a manner which will be more clearly recognized from a consideration of FIG. 21 which is a section view taken along line 21—21 of FIG. 8. In FIG. 21 plate 323 is shown as being mounted for sliding movement at each edge in ways 324 carried by structural frame members 325 of primary arm 32. The baseplate 323 is provided with a central aperture 326 about which and radially therefrom is an annular spigot 327. Mounted on spigot 327 by inner bearings 328 is a ring 329 having a first axial portion 330 and a second radial portion 331 extending radially outwardly and overlapping the spigot 327 and being formed with a peripheral chain sprocket configuration at 332. Mounted on outer bearing 333 is a second annular ring 334 which, as well, is formed with a peripheral chain sprocket configuration 335. Electric motors 336 and 337 are provided mounted upon baseplate 323 nd movable or slidable therewith. Motor 336 is provided with a driving sprocket 338 on its shaft and about driving sprocket 338 is entrained a chain 339 which is also entrained about the sprocket configuration 332 of ring 329. Motor 337 carries sprocket 340 on its shaft driving through chain 341 to ring 334 by means of the sprocket configuration 335 formed on its periphery.

The radial flange 331 of ring 334 carries vertically extending pins 342 at three equiangularly spaced points about the periphery of opening 326 in baseplate 323 which is, of course, axially aligned with opening 343 in ring 329 and which, together, define the opening through which the tree trunk will enter the apparatus and pass therethrough. Ring 334 also is provided with pins, these bearing reference numeral 344 and pins 344 pass through arcuate slots 345 formed in the radial flange 331 of ring 329. The upper ends of pins 342 and 344 can be seen in FIG. 2 mounting the debarking and debranching tools 320, one of which is also shown in dotted lines in FIG. 21.

It will be apparent that since pins 344 pass through slots 345 in ring 329, it is necessary that motors 336 and 337, for the most part, run in synchronism and that ring 329 is rotated at exactly the same speed as ring 334. In this way, the tools 320 will be caused to orbit the axis of apertures 326 and 343 with their inner ends describing a circle concentric with that axis. If ring 329 were, as seen in FIG. 2, to be advanced slightly ahead of ring 334, then pin 342 would be displaced angularly relative to pin 344 with the result that the relative position of tool 320 would change, the inner end of the tool moving radially outwardly in order to describe a larger circle about the axis of openings 326 and 343. Conversely, if ring 343 were to be advanced relative to ring 329 or, in other words, rotated slightly faster for a very brief moment, then pin 344 would "catch up with" pin 342 thereby changing the angular position of tool 320 so as to move its free end radially inwardly to describe a smaller circle in its orbit about the common axis of openings 326 and 343. Accordingly, the opening and closing of tools 320 so as to, in the first place, provide a wide open entry port for the initial entry of the butt end of a severed tree and to subsequently close down upon that tree to remove its bark and to follow the changing diameter of that tree as it is fed into the machine from its largest diameter adjacent its butt to its smallest diameter adjacent its tip can be achieved by simply selectively controlling the relative speed of rotation of motors 336 nd 337 over a narrow range and over a very brief time interval so as to provide a very precise, accurate and immediately responsive control of the debarking tools 320. Numerous advantages flow from this construction, not the least of which is that the entire rotating mass can be dynamically balanced so as of reduce vibrational and centrifugal and gyroscopic loads which are attendant upon prior art debarking arrangements in which the centrifugal force of rotating weights is used to control the position of the debarking tools.

Formed within the base member 323 and surrounding the central opening 326 is an annular air gallery 346 from which there extend upwardly sloping air jets 347 adapted to direct an upwardly flowing air blast through the aligned openings 326 and 343 for the purpose of blasting upwardly any loose bark or other debris which appears during the debarking operation. As was described above, the majority of the bark will enter the hollow tools 320 and be discharged centrifugally in a radial direction. However, a certain amount of bark would fall downwardly through openings 343 and 326 into the interior of the primary arm 32 and would, in time, accumulate to an objectionable extent. Accordingly, the air blast is provided in order to reduce, as much as possible, the entry of bark and debris within the primary arm 32. The air gallery 346 will be supplied in a known manner (not shown) with compressed air from air lead 174 which is illustrated in FIG. 8.

In addition to performing the debarking function, the radially inner ends of the tools 320 are provided with upwardly extending knives 348 which orbit about the same axis as do the debarking portions of the tools. The knives 348 are provided with cutting edges directed in the direction of rotation and the knives will serve to sever from the tree trunk any projecting branches and, to some extent, to smooth down bumps, knobs and other sharp projections which might interfere with later handling of the tree trunk within the processing apparatus. Reference will be had later to FIG. 17A in greater detail but in this figure the function of the debranching knives can be very readily seen.

Immediately below the debarking-debranching apparatus 33 is the feed and guide apparatus essentially comprising guide idler rollers 350, powered feed rollers 351, feed roller driving motor 352, adjusting motor 353 and supporting framework securely fixed within the structural components of the primary arm 32.

This guide and feed apparatus has been illustrated in FIG. 20 in perspective with the surrounding apparatus environment removed therefrom for clarity and reference to FIG. 20 will facilitate a description and understanding of this mechanism.

The mechanism comprises first vertical main frame member 354 from which there extend a pair of transverse arms 355 sloping rearwardly towards the pivoted end of the primary arm 32. Each arm 355 carries a guide roller 350 which is an idler roller and which is not powered in any way. Further support arms 356 are provided for securely mounting the structure to the structural components of the primary arm 32 in a manner which will be readily understood and which needs no further explanation. A corresponding set of arms 357 mounted below arms 355 carry a second pair of guide rollers 350, the upper set of rollers 350 being vertically aligned with the lower set of rollers 350 and arranged with their axis forming an angle of 90° to one another as can be seen from a consideration of FIG. 13.

Located between the upper set of rollers 350 and the lower set of rollers 350 is a rearwardly extending yoke comprising transverse forward member 358 and a pair of rearwardly extending arms 359 which constitute ways within which may slide mounting flanges 360 of the support mechanism carrying the powered feed rollers 351. Rollers 351 are driven by electric motor 352 running through a gear reduction box 361 and driving sprockets 362 which, in turn, drive chains 363 entrained over sprockets 364 keyed to shafts upon which the feed rollers 351 are also keyed so that operation of the electric motor 35 will result in the powered drive of feed rollers 351.

The position of feed rollers 351 relative to the 90° V formed by idler rollers 350 is determined by the operation of electric motor 353 which is housed within member 358 of the rearwardly extending yoke. The motor 353 is of the double-shaft type driving into a bevel gearbox 365 with each shaft and, thereby, rotating lead screws 366 which are engaged with captive nuts in mounting flanges 360 of the carriage supporting the powered feed rollers 351. Operating the electric motor 353 in one direction will advance the carriage carrying powered feed rollers 351 towards the idler rollers 350 so as to engage a tree trunk positioned therebetween and reverse operation of the electric motor will withdraw the carriage from such engagement.

It will be note that a tree engaging or entering the guide and feed apparatus disclosed in FIG. 20 will be engaged at two points spaced along its length and, at each of these points, will e contacted at three points spaced about its circumference. This provides for an extremely stable support and guide for the tree trunk and also provides for simple and positive engagement with the tree trunk by the powered feed rollers 351 which, of course, rotating in he direction of the arrow superimposed upon one roller in FIG. 20 will drive and feed the tree downwardly with respect to FIG. 8.

Before proceeding with the description of the processing apparatus carried within the primary arm 32, it might now be convenient to return once more to a consideration of the tree-grasping apparatus disclosed in FIG. 9, in particular with reference to the slide 226 carried by the head 38.

Initially, it will be appreciated that when the tree is grasped and severed, the slide will normally occupy a position slightly below its uppermost position (i.e. about 1 foot below) relative to the main structural support member 220 of the head 38 as shown on the left-hand head in FIG. 1. The slide will move to its uppermost position during the time that the tree is transported from the position above its stump to the position above the opening into the debarking and debranching mechanism which, at that moment, will be wide open so as to admit the butt of the tree. At this point, the slide cylinder will be actuated to move the slide downwardly thereby beginning to feed the tree into the debarking and debranching mechanism 33 which, at the same time, through control of the feed of motors 336 and 337 will cause the debranching and debarking tools 320 to close down upon the tree trunk, engage it, remove the bark and, if any, the branches associated with the tree. Continued downward movement of the slide 226 will cause the butt of the tree, having passed through the debarking and debranching mechanism and having had its bark removed, to begin to enter the guide and feed mechanism illustrated separately in FIG. 20 and illustrated in its proper relationship with the debarking mechanism in FIG. 8. The amount of travel available by movement of the slide 226 is sufficient for the butt of the tree to descend below the axes of the lower pair of idler rollers 350 and as this occurs, motor 353 will advance the carriage containing the powered drive rollers 351 until these rollers are firmly in engagement with the tree and the support for the tree and the feed downwardly thereof will be assumed by the guide and feed mechanism illustrated in FIG. 20. At this point, the tree-grasping arms 256 associated with the slide 226 will immediately release the tree, the head will back away from the tree and leave the tree under the entire control and supported entirely by the guide and feed mechanism illustrated in FIG. 20 which will continue to feed the tree downwardly, as seen in FIG. 8, through opening 370 in the structural member 175 which, as previously described, supports the ring 177 which, in turn, carries the secondary arm 36. The structural member 175 constitutes a housing for a chipping wheel which is illustrated in FIG. 8 at 371. The chipper 371 is known as a dual truncated cove chipper and has a deep V-shaped groove in its radial periphery, the sides of this groove being provided with chipping teeth or blades which are schematically illustrated at 372 in FIG. 8. The chipping wheel 371 is driven through a gear 373 keyed to its mounting shaft 374, the gear 373 being engaged by worm 375 driven by drive shaft 376 which, in turn, is driven through gear box 377 by electric motor 38.

As the tree is driven downwardly through opening 370 against the chipping surfaces of chipping wheel 371, the tree trunk will be reduced to chips which, initially, by centrifugal force will be flung in the direction of arrow D into duct or conduit 379. Additional kinetic energy will be imparted to the chips at approximately point 380 by air jets supplied with pressurized air from air line 174 to cause the chips to pass upwardly and rearwardly along duct 379 to its first bend 381 which takes place at point such that, above the bend, the duct at 382 is concentric with the centerline of the pivot or rotatable support for arm 32 on column 22. It is essential that the duct be concentric with this axis at this point since, at this point as seen in FIG. 2, duct 379 which rotates with primary arm 32 is joined by means of swivel joint 383 to a stationary continuation of that duct 384 which passes through the structural member and the roof of the control center 24. Additional kinetic energy to the chips is once again supplied by an air jet located conveniently at point 385 as seen in FIG. 8.

Referring to FIG 1, a typical tree of the kind encountered in the southern pine regions of the United States can be seen as comprising relatively straight, long, uninterrupted trunk topped by a few rather small bushy branches. As the tree trunk is fed downwardly into the chipping wheel 371 by means of the feed rollers 351 acting against idler rollers 35, the tree diameter will continually reduce and feed rollers 351 will continually be advanced towards idler rollers 350 by the operation of motor 353. At the same time, debarking and debranching tools 320, under the control of motors 336 and 337 will be following the reducing diameter of the tree trunk so as to continuously perform their operation upon it.

Both the debarking and debranching mechanism 33 and the guide and feed roller mechanism generally shown in FIG. 20 are able to close down so as to bear against and act upon a tree having a minimum diameter of approximately 4 inches. Neither the debarking mechanism nor the guide and feed mechanism can firmly engage and act upon trees of diameters smaller than 4 inches. The characteristic of the kind of tree encountered in the southern pine regions, however, is such that the tree trunk has, as a general rule, more or less disappeared and become indistinguishable from the laterally extending branches by the time the tree trunk diameter has been reduced to something of the order of the 4-inch minimum size.

The debranching knives 348 will, as tree diameter reduces, ultimately orbit about a 4-inch-diameter circle and will sever all of these branches and, at some point, when the tree trunk has ceased to exist as such, the debranching knives 348 will finally sever all of the remaining tree so that the debarking knives then orbiting in a 4-inch circle will no longer contain any material within that circle and, in this way, the top of the tree is simply disposed of by allowing the severed branches to be discharged radially outwardly of the debarking and debranching mechanism to fall upon the ground below the primary arm 32.

In those instances where there is a tree trunk extending in a more or less straight line so as to lie within the 4-inch circle orbited by the debranching knives 348, this small tree trunk will, under the influence of gravity, simply be drawn into the chipping wheel 371 at a very rapid rate since its feed will no longer be under the control of the feed rollers 351 which, as stated above, cannot act upon trees of less than 4 inches in diameter.

In this event, if tree trunk of less than 4 inches in diameter is passed to the chipping wheel, the chipping wheel would then produce chips of a quality unsuitable for pulp production since the bark will not have been removed due to the fact that the debarking apparatus will not act upon trees of smaller than 4 inches in diameter.

To overcome this problem, the duct 379 is provided with a valve 450 which, under "normal" conditions occupies the solid line position shown in FIG. 8. When, however, the debarking and debranching tools 320 have closed down to their minimum extent and are, therefore, incapable of removing bark from trees of smaller diameter, actuator 351 will be energized so as to move the valve 450 from its solid line position to its dotted line position, thereby opening port 352 in duct 379 so as to allow those chips including bark from small diameter tree portions to be ejected onto the ground, thereby avoiding contamination of the chips which are delivered to the duct 379 and, thence to the chip container.

The position of valve 450 may be under the control of the operator within the control center 24 who may visually, observe that a condition such as to require the rejection of the chips is about to occur. Alternatively, the valve 450 may be automatically moved from its full line position to its dotted line position whenever the position of the debarking and debranching tools 320 and/or feed rollers 351 indicate that a tree of such a size that the bark has not been removed is passing through the apparatus.

As has been made clear on previous occasions, all of the apparatus disclosed with reference to FIG. 8 is located both in the left-hand arm 32 as well as in the right-hand arm 32 so that two separate, independent operations may be performed at the same time, one on each side of the machine. To this end, it can be seen that duct 384 as it passes through the roof of the control center 24 merges with a corresponding duct arriving from the processing apparatus housed in the right-hand primary arm 32, both ducts then feeding into a common rearwardly directed delivery duct 386 about which more will be said later.

Having described in some detail the apparatus associated with primary arm 32, it might be convenient to now refer to FIGS. 17 and 17A in which the various functions which have so far been described are illustrated in a more or less schematic form. FIG. 17 illustrates the introduction of the butt end of a tree T into the apparatus and shows the initial debarking of the butt and the radial discharge of the bark through the hollow debarking tools. In the position shown in FIG. 17, the tree is still under the control of, and being fed by the slide 226 although, as can be seen, the carriage containing the powered feed rollers 351 is being advanced in the direction of the arrow F in order to engage the tree trunk when the butt of the tree has passed the axis of rotation of the lower idler rollers 350. The chipping wheel 371 is continuously rotating and is ready to begin the chipping operation on the butt of the tree as soon as it is engaged thereby.

FIG. 17A shows the same tree a few seconds after the position occupied in FIG. 17. It will be noted that the feed rollers 351 are now engaged with the surface of the tree trunk and are driving it downwardly into the chipping wheel 371 which is discharging chips along duct 379 with the assistance of an air jet entering through port 380. The debarking tools 320 are still removing bark from the trunk of the tree and, at the same time, the debranching knives 348 have now encountered branches towards the top of the tree trunk and are removing them before that portion of the tree trunk enters the debarking mechanism.

Further, it will be noted that the diameter of the tree trunk is now reduced and that the centerline of the tree trunk no longer coincides with the centerline of the chipping wheel 371. Since the tree diameter is now smaller, it is obvious that the chipping wheel will require less power to chip the tree trunk at a given linear rate of feed for the tree trunk against the chipping wheel. Such variations in power applied to the function performed by any machine leads to inefficiencies but the present machine embodies a construction which makes it possible to optimize the power applied to any particular function at any time. It will readily be apparent that the diameter of the tree trunk may be measured by the position of the feed rollers 351 relative to a fixed datum point. This measurement of tree diameter can be sensed and converted into a signal supplied to electric motor 352 so as to increase the speed of rotation of the feed rolls 351, thereby feeding the tree of smaller diameter against the chipping wheel at a higher rate of speed so as to bring an optimum amount of power to bear upon the chipping operation. In other words, the chipping wheel may be maintained in a condition approaching constant power during its working cycle by varying the rate of feed of the tree in accordance with the tree diameter.

It should be noted that rollers 351, as can best be seen in schematic drawing FIG. 17A are mounted for a "rocking" motion about an axis indicated at 351A in FIG. 17A. In this way, the feed rollers 351 can accommodate such localized disturbances as may be encountered upon tree trunks being fed through the apparatus.

Earlier in this disclosure it was stated that reference would be made to FIG. 13 and that a description would be given which would relate the movement of the secondary arm 36 to the path along which the tree is fed in the direction of its length through the processing apparatus housed within the primary arm 32.

If reference is made to FIG. 13, the end of primary arm 32 can be seen illustrating in dotted lines the position of idler feed rollers 350 and powered feed rollers 351 and, shown in outline, the maximum opening 343 of the debarker and debrancher mechanism, this maximum opening being defined by the size of the aperture in ring 329 seen in FIG. 21.

It will be obvious that in traversing a forest stand, the machine will be called upon to grasp, sever and process trees of varying diameters and if the solid line position of the secondary arm 36 is considered in FIG. 13, it will immediately be apparent that the axis or center of trees of differing diameters will occupy different positions relative to the centerline of the debarking and debranching mechanism which could cause problems in alignment in introducing the tree therein if appropriate steps were not taken to avoid such problems.

Considering the solid line portion of FIG. 13, it can be seen that the head 38 is adapted to grasp trees of varying diameters between flanges 250, 251 and tree-grasping arms 256. The illustration of FIG. 13 makes it immediately apparent, however, that no matter what the diameter of the tree, its center line will lie upon a line bisecting the right angle between flanges 250 and 251. This is true regardless of the diameter of the tree and has been clearly illustrated in FIGS. 14, 15 and 16 which are fragmentary views showing trees of different diameters resting within the right-angle V defined by flanges 250 and 251.

Idler rollers 350 present surfaces which define an angle of 90° (flanges 250 and 251 are also at 90° to one another). In order to position a tree accurately within the opening 343 of the debarking and debranching mechanism, arm 36 is articulated in such a way that the line bisecting the 90° angle between flanges 250 and 251 is parallel to a similar line bisecting the similar 90° angle between adjacent rollers 350. This is achieved by moving the arm 36 from the position shown in solid lines in FIG. 13 to the position shown in dotted lines in FIG. 13. Simultaneously motor 204 (see FIG. 8) is actuated to drive worm 206 around ring gear 185 so as to raise arm 36 from whatever its position to a vertical position and, in so doing, the V formed by flanges 250 and 251 will, automatically, position itself directly above the V formed by rollers 350 thereby enabling the tree to be fed downwardly along tangents to rollers 350 (both the upper and the lower set), perfectly aligning any diameter of tree with the stationary idler rollers 350. These idler rollers 350 are the significant reference point with respect to this operation. It has already been explained that the diameter of the opening 343 in the debarking and debranching apparatus is approximately 18 inches and is of a size large enough to receive pulpwood trees. The aperture 343 is biased to a central position (see FIG. 17) in line with axis or center line 390 for the preliminary introduction of the butt of the tree. Immediately thereafter, the rotation of the debarking and debranching tools will center the debarking and debranching mechanism about the tree trunk even though, as illustrated in FIG. 13, it may be initially eccentric thereto. Feed rollers 351 ill be traversed inwardly to engage the tree trunk and this engagement, of course, occurs simply when the rollers encounter the surface of the tree trunk and this function is entirely independent of the location of the tree centerline provided only that the tree is in contact with the V formed by the cooperating idler rollers 350. Finally, this apparatus is vertically aligned with opening 370 into the chipping mechanism and the chipper wheel 371 itself is highly tolerant of slight variations in position of the tree butt which encounters its chipping surfaces.

The relationship between flanges 250 and 251 and tree-grasping arms 256 and the position of the tree when it is engaged by the guide and feed rollers 350 and 351 is such, as can be seen from FIG. 13, that the head 38 can be "backed off" after releasing the tree in a straight line without displacing the tree and, thereby, imposing any undue loads or shocks upon the feed and guide apparatus illustrated in FIG. 20.

Chip Container and Handling Mechanism

In the immediately preceding description the processing apparatus by means of which chips are produced and delivered into duct 379 has been discussed and this description has included mention of the fact that ducts 379, through swivels 383 lead into fixed ducts 384 housed within the roof of the control center 24, these ducts from both processing stations in both primary arms 32 merging into a common rearwardly directed delivery duct 386 illustrated in FIGS. 1 and 2.

Turning now to FIG. 22, the rear chassis section 11 including the arch or bridge comprising columns 22 (not shown in FIG. 22) and inwardly sloping elements 23 are shown together with the central bridging span 400. The arch composed of elements 22, 23 and 400 is braced and stabilized by strut 401 extending from chassis section 11 to the upper end of portion 23 of the arch. At the upper ends of portion 23 of the arch there are provided a pair of parallel forwardly and rearwardly extending cantilevered arms 402 which, on their inner and facing surfaces, are provided with ways or tracks 403 as can be seen in FIG. 22.

Supported by and riding in ways 403 and a similar track or way on the forward portion 402A of arms 402 is a carriage composed of a first transverse member 404 and a second similar transverse member 405 which are joined together by tie rods 406 passing through and sliding in sleeves carried by bridge or arch member 400. A first electric motor 407 is mounted upon transverse strut 404 and drives a bevel gear which, in turn, drives two bevel gears connected to shafts 408 and 409 which carry worms 410 at their ends engaging with gears 411 carried by lead screws 412 extending downwardly adjacent each end of strut 404. Lead screws 412 engage nuts 413 which are captive in bar 414 and, as can be seen, rotation of the motor 407 in one direction will cause lead screws 412 to rotate thereby allowing captive nuts 413 in bar 414 to descend and, in the other direction, causing nuts 413 and bar 414 to ascend. Strut 405 at the forward end of the carriage is provided with a similar electric motor 415 driving through a bevel gearbox 416 in a similar manner to rotate shafts 417 and 418 which, in a manner identical to that already described will operate lead screws 420 (only one of which is shown) engaging captive nuts in bar 421 which is forwardly spaced from but parallel to bar 414.

Bars 421 and 414 are each provided with two hooklike members 422 which can be moved towards or away from each other by actuators 423.

The fore-and-aft position of the carriage comprising struts 404 and 405 is controlled by electric motor 424 operating worm 425 which rotates nut 426 about lead screw 427 which is free to traverse axially through the nut 426 but which may not rotate. Thus, operating electric motor 424 in one direction will cause lead screw 427 to move through nut 426 in, for example, the direction of arrow F in FIG. 22 and, operating the motor in the opposite direction would cause movement of the carriage in the opposite direction.

The container adapted to receive chips produced in both of the primary arms 32 is, as seen in FIG. 22, conveniently of the size of a conventional semitrailer for highway use and comprises a body 430 provided with conventional running gear 431 and which will be provided, (although not shown) with a conventional fifth wheel attachment at approximately 432. The body 430 of the trailer will be provided with sockets 433 at each of four points adapted to receive hooklike members 422 so that the trailer can be engaged thereby, lifted by the operation of lead screws 412 and 420 until it is raised to the upper limit of the travel of nuts 413 on lead screws 412 and 420. Once this vertical movement has been achieved, forward movement of the carriage consisting of struts 404 and 405 will move the trailer body 430 forwardly until specially provided slots or notches 434 on each of the forward lower corners engage brackets 435 carried by the chassis frame 11. At the same time, rearwardly directed delivery duct 386 will enter delivery aperture 436 provided in the forward wall of the trailer body 430 so that chips discharged through this delivery duct 386 will be blown into the container constituted by the trailer body 430.

It is contemplated that the construction of the trailer body 430 will be of a simple but strong steel skeleton enclosed by a wire mesh of the like which will retain the chips blown therein but which will provide for free exhaust of the air entering through duct 386 by means of which the chips are conveyed along ducts 379, 384 and 386 into the container body.

When the trailer body 30 has been filled with chips, the vehicle will forward the container to a road where electric motors 424, 415 and 407 will be appropriately operated to disengage slots 434 from brackets 435, move the trailer rearwardly, then lower it downwardly until it rests upon its running gear 431 and conventional, retractable, landing gear whereupon hooks 422 may be disengaged from sockets 433 to deposit the trailer upon the ground. The trailer may then be picked up by a highway tractor and the contained chips transported to a pulpmill. The machine may then position itself with respect to a fresh empty container identical to that disclosed and illustrated in FIG. 22, pick it up, firmly engage it, couple the duct 386 into opening 436 and proceed with the chip producing function as the vehicle traverses the forest stand in the manner which has been previously described.

Vehicle and Machine Geometry

Throughout the preceding description, reference has been made from time to time to the fact that various vehicle and machine components rotate relative to other components about certain axes and in certain planes and to the fact that other component movements take place. While the description is believed to have been adequate and to have been clear in connection with each of the movements described, reference to FIG. 24 will enable an overall understanding of the machine and vehicle geometry to be readily obtained. Each of the movements which takes place in the vehicle and in the components supported thereby have been plotted and the axes, planes, directions and extents of these movements have been shown.

In FIG. 24, the "stripped" chassis of the vehicle of FIGS. 1 and 2 is shown with its two primary arms 32, two secondary arms 36 and two heads 38 in positions which will enable these movements to be readily appreciated.

In structure, the vehicle and the components carried thereby may be seen to be symmetrical about a longitudinal centerline indicated in FIG. 24 by reference letters CLV. The position of arms 32, 36 and heads 38 need not be symmetrical about this centerline but the mechanism on one side is reproduced in mirror image on the other side. In describing the movement of this mechanism, where appropriate, reference will be made to this centerline as a datum relative to which direction can be indicated.

Figure 6:
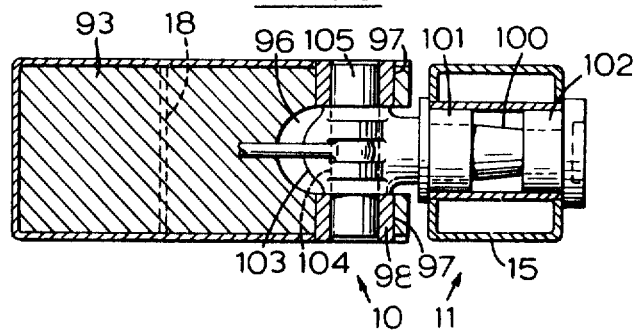
FIG. 6 is a section view taken along line 6—6 of FIG. 5.

The "strippe" chassis of the vehicle shown in FIG. 24 includes the forward chassis section 10 and the rear chassis section 11 which are secured together at a center joint CJ which has been separately illustrated in some detail in FIGS. 5 and 6. Chassis 10 and 11 may pivot relative to one another about vertical axis 500 at center joint CJ. In the position shown in FIG. 24, chassis sections 10 and 11 are in what may be considered a "zero" position and the pivotal movement about vertical axis 500 is in a horizontal plane through an angle $\alpha$ indicated by the arrows. The angle on either side of the "zero" position is 45° allowing for a total pivotal movement of 90° in a horizontal plane about vertical axis 500.

At center joint CJ chassis 10 and 11 may also roll relative to one another about axis 501 which coincides with centerline CLV. This movement takes place in a vertical plane through an angle $\beta$ on either side of a "zero" position (in which the vehicle is shown). Angle $\beta$ amounts to 22½° on each side of the "zero" position for a total roll movement of 45°.

At each wheel station there is provided a pivot walk assembly including a foot 123 and a column 122. The foot 123 is capable of vertical movement along axis 502 through a distance E from its uppermost position 123A to a lowermost position 123B and, in any position, is capable of unlimited rotation about axis 502 as indicated by arrow 503. In its uppermost position 123A, foot 123 will be approximately 2½ feet above plane GZ (Ground Zero) which is the plane or interface between the wheels and the supporting surface upon which the vehicle rests. The total distance E of vertical travel of foot 123 is approximately 5 feet. Each wheel station carries a foot 123 and a column 122, each of which is capable of the same movements to the same extent as that described.

Axis 502 along which column 122 and foot 123 may reciprocate is also the axis about which primary arm 32 is mounted for rotation in a horizontal plane through angle $\gamma$ indicated by the arrow. As illustrated in FIG. 24, the primary arm 32 is in the position represented by the line 504 and its "zero" position is indicated by reference character O associated with the arc representing angle $\gamma$. Angle $\gamma$ extends from a position approximately 15° on the centerline side of the "zero" position to a point approximately 125° on the outside of the "zero" position. Identical remarks apply to the movement of both primary arms 32.

Secondary arm 36 is mounted on the free end of primary arm 32 for rotation in a horizontal plane about a vertical axis 505 which is parallel to axis 502 and, of course, also parallel to the center joint axis 500. Secondary arm 36 may rotate about vertical axis 505 in a horizontal plane through angle $\mu$ represented by the arrow from a "zero" position in which it will be parallel with arm 32 (this "zero" position is not constant but is dependent upon the position of arm 32) towards the centerline CLV through angle $\mu$ which amounts to approximately 120°. The position of arm 36 as seen in FIG. 24 is represented by line 506 intersecting the arrow identifying angle $\mu$ which is also the line identified by reference character I indicates the position of arm 36 relative to the "zero" position in which the secondary arm 36 is shown in dotted lines in FIG. 13. The "zero" position of arm 36 is indicated by the line identified by reference character O associated with axis 505 and it is to be noted that this line is parallel with line 504 and, therefore, parallel with arm 32.

Secondary arm 36 is also mounted for rotation about horizontal axis 507 which intersects with axis 505 The rotation of arm 36 about axis 57 is in a vertical plane through angle $\xi$. Angle $\xi$ amounts to approximately 115° of which 25° is below the "zero" or horizontal position identified by reference character O and 9° above the "zero" or horizontal position.

Head 38 is mounted upon the free end of arm 36 for rotation about horizontal axis 508 and the angular displacement of head 38 is in a vertical plane through angle $\psi$ which is identical to angle $\xi$ about axis 507. As has been described, the position of head 38 is maintained in a vertical orientation by a follower mechanism so that, as disclosed, head 38 is not independently rotatable about axis 508.

Slide mechanism 226 carried by head 38 also carries tree grasping arms 256 both of which rotate about vertical axis 509 through angle $\lambda$ which equals 105°. The "zero" position of arm 256 is indicated by reference character O associated with the arc round axis 509 and, in this position, the arms 256 are in their fully open position. After rotating through 105°, arms 256 are in position to clamp a tree of 4 inches diameter against flanges 25 and 251 carried by the slide 226. The average size of pulpwood tree is about 9 inches in diameter and such a tree will be clamped by movement of arms 256 through 75° from the "zero" position.

The slide mechanism 226 on the right-hand arm 36 as seen in FIG. 24 is capable of vertical reciprocation through the vertical distance S from a "normal" or 'zero" position which is 1 foot below its uppermost position. The vertical distance S is 6.5 feet. The slide 226 associated with the left-hand head 38 in FIG. 24 is shown in the "zero" position and, on the right-hand head 38 it is shown in its lowermost position.

Finally, the movement of he shearing arms 292 is in a substantially vertical plane about horizontal axes 510 through angles $\Delta$ each of which equals approximately 180°. In the "zero" position identified by reference character O, the arms 292 are in their upper or "cocked" position as indicated on the right-hand head 38 in FIG. 24. Movement through angle $\Delta$ which is 180° will place the arms 292 in their tree-shearing position in which they are shown in association with the left-hand head 38 in FIG. 24.

It should be noted that axis 55 is also the "centered" axis for the debarking and debranching mechanism 33 carried by primary arms 32 and the direction of rotation of the debarking and debranching mechanism 33 can be seen from arrow 51 in FIG. 24.

It can also be see from FIG. 24 that axis 502 which is the axis of rotation of primary arm 32 is also the axis for rotation of the swivel 383 by means of which stationary duct 384 is connected to duct 379 which moves with primary arm 32.

Finally, it may be mentioned that in the preferred embodiment of the illustrated machine, the wheel base dimensions indicated by reference character WB in FIG. 24 will equal 24 feet and the pivot tread or the distance between the center of feet 123 on opposite sides of each chassis section indicated by reference character PT is also 24 feet. The wheel triad indicated by reference character WT is 13.5 feet.

While the preceding description has given specific dimensions and degrees of angular movement for various components and while it is believed that these dimensions and angular measurements are optimum or at least substantially so for the set of environmental conditions in which the machine is intended to operate, it should be clearly understood that these dimensions and angular extents have been given solely for the purpose of clarifying the description and illustrating the principles upon which the machine operates and are not to be construed as limiting of the invention in any way.

Vehicle Advance and Tree-Harvesting Operation

The invention of FIGS. 1 and 2 is shown partly cutaway in FIG. 25, from a position above and behind the operator's control center 24 with the control center itself cutaway and with only a portion of the rear chassis section 11 visible. The primary arms 32 are shown in representative positions as are secondary arms 36 and heads 38.

The machine has been shown in the environment of a typical southern pine forest through which it is moving in the direction of arrow CLV along a strip or swath, the margins of which may be seen as indicated by lines 600 and 601. Earlier in the disclosure it was stated that the maximum lateral reach of the heads 38 is approximately 70 feet. In fact, the absolute maximum reach is 73 feet and the transverse distance between lines 600 and 601 will normally be 66 feet, thereby providing a margin or safety factor so as to ensure that the heads 38 can reach every tree within the area over which they are to operate at each vehicle position.

Area 602 to the left of line 600 represents cutover strip or swath which has previously been traversed by the machine and from which the trees have been harvested, leaving only stumps 603. The machine is now seen traversing the next adjacent strip between lines 600 and 601 from which it will harvest the trees illustrated at 604 while leaving untouched the trees standing in the area to the right of line 601 and identified by reference 605. These trees will be harvested on the next swath traversed by the machine.

The diagrammatic showing indicated generally at the bottom of the sheet containing FIG. 25 illustrates a vehicle advance on what is referred to as a "square setting." As was described earlier in the application, the vehicle may be advanced by the actuation of the pivot walk feet 123 and columns 122 coupled with the actuation of the hydraulic cylinders associated with the steering mechanism located at the center joint illustrated in FIGS. 5 and 6.

In order to describe the vehicle advance as represented in FIG. 25, let it be assumed that, at one time, the vehicle stood with feet 123 of front chassis 10 in the position indicated by the footprints 606 for the left foot and 607 for the right foot. During the time the vehicle stood in this position, its heads 38 wee grasping, shearing and harvesting trees lying in the two arcuate areas identified by reference numerals 608 and 609. When all the trees in areas 608 nd 609 had been harvested, the right foot 123 standing in footprint 607 was raised, the hydraulic cylinders associated with the center joint actuated while leaving left foot 123 in the footprint 606 so as o anchor the vehicle at this point. The articulation of the vehicle about its center joint (axis 500 in FIG. 24) took place through angle $\alpha$ with chassis section 10 articulating in a counterclockwise direction (as seen in FIG. 25) relative to chassis section 11. As a result of this, right foot 123 advanced from footprint 607 to a position in which it could occupy footprint 610 whereupon right foot 123 was moved downwardly to engage the ground at this point to anchor the vehicle. Left foot 123 was then raised, the vehicle articulated at its center joint through angle $2\alpha$ in a direction such that chassis section 10 rotated in a clockwise direction relative to rear chassis section 11 so as to position left foot 123 above footprint 611. Left foot 123 was then moved downwardly into footprint 611, right foot 123 was raised and the chassis articulated, again in a counterclockwise direction, through angle $\alpha$ to position the right foot 123 above footprint 612. Right foot 123 was then lowered to engage the ground in footprint 612, thereby providing firmly supported and stable platform from which arms 32 and 36 and heads 38 were able to sweep areas 613 and 614 and harvest the trees therefrom.

When the trees had been removed from areas 613 and 614, the forward advance cycle of the invention was repeated so as to position feet 123 (both the left and right feet) in the positions in which they are now shown in FIG. 25, thereby positioning heads 38 so as to sweep and harvest trees from the areas shown as 615 and 616 within which they are shown as operating in FIG. 25.

This pivot walk method of machine or vehicle advance permits precision movement of the vehicle and the platform which it constitutes for the arms 32, 36 and the heads 38. The "square setting" illustrated in FIG. 25 may be considered as a normal form of machine advance. However, a "skew setting" could be achieved if the advance from footprint 610 to footprint 612 had been achieved by an articulation of an angle $2\alpha$ rather than an angle $\alpha$. Such an advance or variations thereof might be desirable for any number of reasons, such as, for example, the presence of unsatisfactory terrain, a stand of small and worthless trees, or because such movement is the initial step in the change of direction along which the machine intends to advance through the forest stand.

It is of fundamental importance to the efficient operation of the invention that this precision movement which is made possible by the pivot walk method of machine advance be achieved. The precision advance enables a uniform and controllable relationship to be established between the successive operating cycles of the machine as it advances from one operating setting to another. It ensures that the areas 608 and 609, for example, are of the optimum size for the efficient functioning of the arms 32, 36 and the heads 38, enabling a balance to be obtained between the cycle time required for these arms to reach out, grasp, sever a tree and return it to the tree-processing apparatus carried within the primary arm 32 and he time taken for such a tree to pass through this processing apparatus and be converted to chips. If too small an area is made available by the machine advance, an uneconomically large percentage of time will be involved in advancing the machine. If too large an area becomes available after a machine advance, it may be that some trees will be out of reach of the head 38 and will either be missed or will constitute an undesirable interference with the free movement of the arms during the harvesting operation. In general, it is fundamental to the efficient operation of any machine that it be given a task to perform which it can deal with and handle efficiently and economically and, to this end, the precise repetition of an efficient cycle is of primary importance This precise repetition of an efficient cycle is achieved by the precise advance of the vehicle due to the pivot walk mode of vehicle progression.

Once the vehicle has assumed a position from which its arms 32, 36 nd heads 38 can sweep an area containing trees to be harvested, the harvesting operation will begin by having the heads 38 approach, grasp and sever those trees which are closest to the marginal boundries 600 and 601 of the setting area. In FIG. 25, therefore, the first tree harvested by the right head 38 was that tree which once stood upon the stump identified by reference character 617 and, obviously, the first tree harvested by the left head 38 was that which once stood upon the stump identified by the reference character 618.

In FIG. 25 the left system can be seen to be in the act of processing tree 619 which is under the control of guide and feed rollers illustrated in FIG. 20 and which is being converted to chips at its lower end and which, at the debarking and debranching mechanism 33 is being acted upon by this apparatus. Tree 619 in FIG. 25 is in a position very similar to the position of the tree which is more schematically illustrated in FIG. 17A. Simultaneously with the operation that is being carried out upon tree 619, head 38 has grasped tree 620 and the shears have just severed it from its stump. It is to be noted that the side 226 is in its "zero" or normal position. From the position and condition illustrated in FIG. 5, the following steps will take place in association with the left head 38.

1. The shears will be retracted or returned to their 'cocked" or "zero" position (see the right head in FIG. 24).
2. Slide 226 will move upwardly from its "zero" position to its uppermost position.
3. Arm 36 will begin to move to the dotted line position in which it appears in FIG. 13 which is represented by reference character I associated with axis 505 in FIG. 24.
4. Arm 36 will begin to rotate about axis 507 towards its vertical position.

All of these motions will take place more or less simultaneously to the end that as tree 619 has been completely processed by the debarking and debranching mechanism 33 nd the chipping wheel, tree 6 will be in a position to be introduced into the debarking mechanism 33 by the downward movement of slide 26 through distance S as seen in FIG. 24.

The operations following the operations which have just been described with respect to the left head can now be seen with respect to the right head of FIG. 25 The right primary arm 32 in FIG. 25 is in control of and is acting upon tree 621 which is in roughly the position represented by the tree in FIG. 17. Head 38 and arm 36, having released tree 621 once its control was assumed by the feed and guide rollers of right primary arm 32, as returned to a position approaching tree 622 which it is about to grasp and shear. Note that he tree grasping arms 256 are in their "zero" or wide open position ready to grasp the tree and that the tree shears are in their "zero" or "cocked" position ready for the tree-shearing operation once the tree has been grasped.

Finally, it should be pointed out that tree 623 which will, no doubt, be grasped, severed and processed by the left system as seen in FIG. 25 (because this left system will likely be ready for it before the right system has completely processed tree 622) is, nevertheless, in an area where it can be reached by either the left or the right system In this way, the right or the left system can "assist" the other system in the event that one system would otherwise stand idle while further trees were being acted upon in the other area.

Process Computer Control

While it is beyond the scope of this patent application to discuss in detail the application of a process computer to the control of the various machine and vehicle functions which have been described in detail, it is important to stress the fact that machine and vehicle design are such as to lend themselves to the ready application of process computer technology.

The vehicle advance which takes place as the result of engaging the ground with the pivot-walk feet 123, followed by chassis articulation and then followed by the exchange of one foot for another in ground engagement is a sequence of operations which can be placed under the control of a process computer. The angular displacement or the value of $\alpha$ in vehicle advance will, for the "square setting" disclosed in FIG. 25 produce vehicle advance A equal to 2PT sin $\alpha$ and this distance will be reproduced in vehicle advance for every pivot walk cycle along a line of vehicle travel indicated by the arrow CLV with no attention required on the part of an operator other than to initiate the cycle which will then be completed under the control of a process computer.

Similarly, the movement of arms 32 and 36 and of head 38 in reaching out to grasp a tree, sever it, return it to the processing apparatus and to then return once more for another tree can all be programmed within a process computer so that the function of the operator may be reduced to selecting that tree which it is desired to grasp and sever and to then identify that tree for the computer so that it may select a program which will produce the required movements in the primary arm 32 and the secondary arm 36 in order to position the head 38 where it may grasp the tree with arms 256.

The identification of a tree to be harvested can be achieved by identifying a value for two coordinates which determine the position of tree within a setting area such as, for example, setting area 615 in FIG. 25. Consider, in this connection, tree 63 This tree or, properly speaking, its location can be precisely determined by providing a value for an X coordinate which is the distance between the center line CLV and the tree measured along an X axis at right angles to line CLV. A measurement for a Y coordinate can be obtained from any datum line, e.g. datum line SA (Setting Area) shown in FIG. 25. Datum line Sa is, conveniently, shown at a point where the two arcs defining areas 615 and 616 intersect but, of course, this datum line can be located at any arbitrary position provided only that its position is constant relative to a fixed point on the machine. Coordinates X and Y can be then fed as inputs to the computer which will provide appropriate signals to the electric motors necessary to manipulate arms 32 nd 36 and will enable one of the heads 38 to be positioned with the greatest economy of movement and time so that it may grasp the tree 623 with arms 256.

One further coordinate is required and that is a Z coordinate representing the distance above plane GZ (Ground Zero) at which the shears are to sever the tree from its stump. This Z coordinate is identified in FIG. 25 as the distance between plane SB above datum GZ. A boulder or rock may occupy a position in which it would be struck by he shears if the head 38 were not raised so as to enable the shears to clear such an obstruction. The measure of coordinate Z may be visually determined by an operator who, from the control center 24, can readily observe and determine an appropriate measure for the Z coordinate for the tree which he has selected.

Providing a measure for the X and Y coordinates can be achieved by any of a number of systems such as optical or electronic ranging and direction finding instruments. Such instruments can produce either directly or indirectly, measures of direction and range which can be directly or indirectly converted into X, Y nd Z coordinates all of which can be either directly or indirectly converted to computer inputs in order to produce computer outputs which will constitute control signals to the actuating motors determining the movement and final position of arms 32 and 36 and, accordingly, head 38.

Operator decision making, under such circumstances, could be limited to selecting that tree which it is desired to process and maintaining visual supervision over the operation to ensure that no unusual or abnormal conditions exist. The operator would, of course, have a manual override control on such an automated system so that he could take over complete control of arms 32 and 36 in the event that, for example, it is necessary to process a tree which is either leaning from the vertical or which is, in some other way, less accessible as, for example being located in an area of natural obstruction such as rocks, fallen trees, and the like.

In the introduction to this application it was stated that the present invention concerns itself with the provision of a machine and a system for its operation which will enable the efficient conversion of a living, growing tree to chips suitable for pulp production. It is believed that the foregoing description has disclosed a machine which fulfills this objective and which does so in a manner which enables an optimum degree of efficiency and productivity to be brought to the forest operations associated with the pulp and paper industry.

I claim:

1. A shearing mechanism comprising a support structure, pair of spaced, parallel axes carried by the support structure, an arm fixedly mounted upon each axis by one end and, at the other end carrying a weighted shearing blade and means carried by the support structure and adapted to act upon the parallel axes to rotate them in opposite directions so as to rapidly move the arms and their weighted shearing blades from a first position in which the arms are generally parallel, extend upwardly and present oppositely directed, outwardly facing shearing blades, to a second position in which the arms are generally parallel, extend downwardly and present oppositely directed, inwardly facing shearing blades.

2. A shearing mechanism as claimed in claim 1 wherein the arms are resilient and their movement is a very rapid one of high acceleration.

3. A shearing mechanism as claimed in claim 1 wherein the means carried by the support structure and adapted to act upon the axes comprises an hydraulic cylinder having a longitudinal axis normal to the plane containing the two parallel axes and having piston and piston rod movable along the said axis, the piston rod having a toothed rack along at least a portion of its length, a gear mounted for rotation in the support structure and in engagement with the rack so as to rotate under axial displacement of the piston rod and means to transmit rotation of the gear to the axes carrying the shearing arms.

4. A shearing mechanism as claimed in claim 3 herein the hydraulic cylinder contains two pistons, one at each end of a central piston rod, each piston enclosing a fluid chamber on that side hereof remote from the piston rod and the cylinder is provided with an aperture in its sidewall between the pistons to admit the gear to engage the toothed rack.